US009538164B2

(12) United States Patent
Bi et al.

(10) Patent No.: US 9,538,164 B2
(45) Date of Patent: Jan. 3, 2017

(54) STEREOSCOPIC CONVERSION WITH VIEWING ORIENTATION FOR SHADER BASED GRAPHICS CONTENT

(71) Applicant: QUALCOMM Incorporated, San Diego, CA (US)

(72) Inventors: Ning Bi, San Diego, CA (US); Xuerui Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 13/738,514

(22) Filed: Jan. 10, 2013

(65) Prior Publication Data

US 2014/0192053 A1 Jul. 10, 2014

(51) Int. Cl.
G06T 15/80 (2011.01)
H04N 13/02 (2006.01)
G06T 15/00 (2011.01)

(52) U.S. Cl.
CPC ......... H04N 13/0278 (2013.01); G06T 15/005 (2013.01)

(58) Field of Classification Search
USPC ........................................................ 345/426
See application file for complete search history.

(56) References Cited

U.S. PATENT DOCUMENTS

| 6,226,006 B1 * | 5/2001 | Collodi .......................... 345/426 |
| 8,004,515 B1 * | 8/2011 | Cook .................... G03B 35/00 345/419 |
| 8,174,561 B2 | 5/2012 | Andersson |
| 2008/0007559 A1 * | 1/2008 | Kalaiah et al. ............... 345/501 |
| 2009/0282429 A1 | 11/2009 | Olsson et al. |
| 2012/0038635 A1 | 2/2012 | Stamate et al. |
| 2012/0050465 A1 * | 3/2012 | Lee et al. ........................ 348/43 |
| 2012/0056885 A1 | 3/2012 | Ishii et al. |
| 2012/0154378 A1 | 6/2012 | Kitchens |
| 2012/0190447 A1 * | 7/2012 | Maeno ............................ 463/31 |
| 2012/0235999 A1 * | 9/2012 | Bi et al. ........................ 345/426 |
| 2012/0236002 A1 | 9/2012 | Bi et al. |

FOREIGN PATENT DOCUMENTS

CN 101971606 A 2/2011
CN 101976451 A 2/2011
(Continued)

OTHER PUBLICATIONS

Gateau, Samuel and Nash, Steve, "GPU Technology Conference: Implementing Stereoscopic 3D in Your Applications", Nvidia Corporation, pp. 1-76. [retrieved on Jun. 23, 2015]. Retrieved from the Internet: <URL:http://www.nvidia.com/content/GTC-2010/pdfs/2010_GTC2010.pdf>.*

(Continued)

*Primary Examiner* — Barry Drennan
*Assistant Examiner* — Terrell Robinson
(74) *Attorney, Agent, or Firm* — Shumaker & Sieffert, P.A.

(57) ABSTRACT

The example techniques of this disclosure are directed to generating a stereoscopic view from an application designed to generate a mono view. For example, the techniques may modify instructions for a vertex shader based on a viewing angle. When the modified vertex shader is executed, the modified vertex shader may generate coordinates for vertices for a stereoscopic view based on the viewing angle.

31 Claims, 10 Drawing Sheets

(56) References Cited

FOREIGN PATENT DOCUMENTS

| WO | 2009095862 A1 | 8/2009 |
| WO | 2012021967 A1 | 2/2012 |
| WO | 2012140397 A2 | 10/2012 |

OTHER PUBLICATIONS

Akka R., "Converting Exisiting applications to Support high quality stereoscopy", Proceedings of spie, vol. 3639, Jan. 25, 1999 (Jan. 25, 1999), pp. 290-299, XP008022010, ISSN: 0277-786.
International Search Report and Written Opinion—PCT/US2013/074072—ISA/EPO—Mar. 17, 2014, 11 pp.
OpenGL Reference Manual, Third Edition: The Official Reference Document to OpenGL, Version 1.2, Editor: David Shreiner, Sep. 2001, pp. 238-239.
Second Written Opinion from International Application No. PCT/US2013/074072, dated Nov. 13, 2014, 5 pp.
International Preliminary Report on Patentability from International Application No. PCT/US2013/074072, dated Mar. 26, 2015, 9 pp.

\* cited by examiner

STEREOSCOPIC CONVERSION WITH VIEWING ORIENTATION FOR SHADER BASED GRAPHICS CONTENT

TECHNICAL FIELD

This disclosure relates to graphics data processing, and more particularly, to graphics data processing for stereoscopic view.

BACKGROUND

Stereoscopic view refers to a perceived image that appears to encompass a 3-dimensional (3D) volume. To generate the stereoscopic view, a device displays two images on a 2-dimensional (2D) area of a display. These two images include substantially similar content, but with slight displacement along the horizontal axis of one or more corresponding pixels in the two images. The simultaneous viewing of these two images, on a 2D area, causes a viewer to perceive an image that is popped out of or pushed into the 2D display that is displaying the two images. In this way, although the two images are displayed on the 2D area of the display, the viewer perceives an image that appears to encompass the 3D volume.

The two images of the stereoscopic view are referred to as a left-eye image and a right-eye image, respectively. The left-eye image is viewable by the left eye of the viewer, and the right-eye image is not viewable by the left eye of the viewer. Similarly, the right-eye image is viewable by the right eye of the viewer, and the left-eye image is not viewable by the right eye of the viewer. For example, the viewer may wear specialized glasses, where the left lens of the glasses blocks the right-eye image and passes the left-eye image, and the right lens of the glasses blocks the left-eye image and passes the right-eye image.

Because the left-eye and right-eye images include substantially similar content with slight displacement along the horizontal axis, but are not simultaneously viewable by both eyes of the viewer (e.g., because of the specialized glasses), the brain of the viewer resolves the slight displacement between corresponding pixels by commingling the two images. The commingling causes the viewer to perceive the two images as an image with 3D volume.

SUMMARY

In general, the techniques of this disclosure are directed to modifying instructions that generate a mono view to cause a graphics processing unit (GPU) to generate a stereoscopic view. A shader program of the GPU may be designed to generate a mono view. The techniques described in this disclosure modify the instructions of such a shader program based at least on a viewing angle to generate stereoscopic view. For example, the techniques modify instructions of the shader program to displace a location of a pixel by one direction for one of the views of the stereoscopic view, and to displace the location of the pixel in another direction for the other view of the stereoscopic view. The direction in which the modified shader program displaces the location of the pixel is based on the viewing angle.

In one example, the disclosure describes a method for graphics processing. The method includes determining, with a processor, a viewing angle relative to a display, receiving, with the processor, instructions for a vertex shader that is configured to operate on an image of a mono view, and modifying, with the processor, the instructions for the vertex shader to include one or more instructions based on the viewing angle to generate a modified vertex shader. In this example, the modified vertex shader, when executed, generates vertex coordinates for vertices of a stereoscopic view. The method also includes instructing, with the processor, a graphics processing unit (GPU) to execute the modified vertex shader.

In one example, the disclosure describes an apparatus. The apparatus includes a graphics processing unit (GPU) and a processor. The processor is configured to determine a viewing angle relative to a display, and modify the instructions for the vertex shader to include one or more instructions based on the viewing angle to generate a modified vertex shader. In this example, the modified vertex shader, when executed, generates vertex coordinates for vertices of a stereoscopic view. The processor is also configured to instruct the GPU to execute the modified vertex shader.

In one example, the disclosure describes a processor. The processor is configured to determine a viewing angle relative to a display, receive instructions for a vertex shader that is configured to operate on an image of a mono view, and modify the instructions for the vertex shader to include one or more instructions based on the viewing angle to generate a modified vertex shader. In this example, the modified vertex shader, when executed, generates vertex coordinates for vertices of a stereoscopic view. The processor is also configured to instruct a graphics processing unit (GPU) to execute the modified vertex shader.

In one example, the disclosure describes an apparatus that includes a graphics processing unit (GPU), means for determining a viewing angle relative to a display, means for receiving instructions for a vertex shader that is configured to operate on an image of a mono view, and means for modifying the instructions for the vertex shader to include one or more instructions based on the viewing angle to generate a modified vertex shader. In this example, the modified vertex shader, when executed, generates vertex coordinates for vertices of a stereoscopic view. The apparatus also includes means for instructing the GPU to execute the modified vertex shader.

In one example, the disclosure describes a computer-readable storage medium having instructions stored thereon that, when executed, cause one or more processors to determine a viewing angle relative to a display, receive instructions for a vertex shader that is configured to operate on an image of a mono view, and modify the instructions for the vertex shader to include one or more instructions based on the viewing angle to generate a modified vertex shader. In this example, the modified vertex shader, when executed, generates vertex coordinates for vertices of a stereoscopic view. The instructions further cause the one or more processors to instruct a graphics processing unit (GPU) to execute the modified vertex shader.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
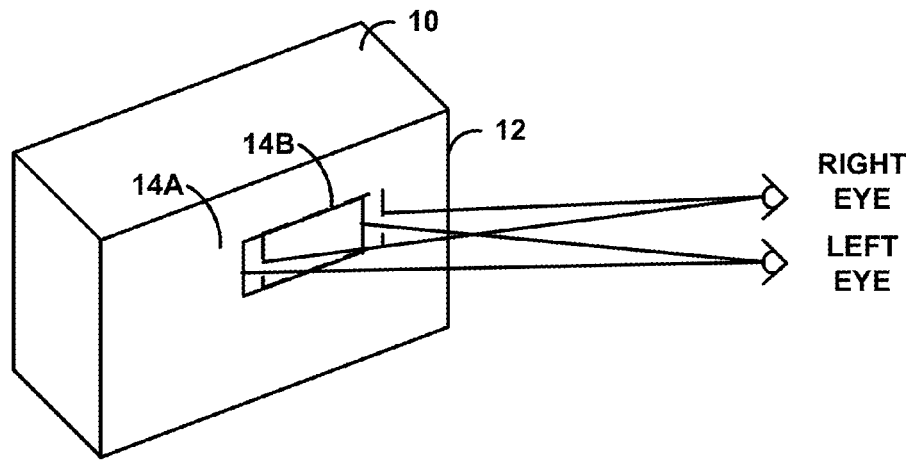
FIG. 1 is a conceptual diagram illustrating a display that is displaying stereoscopic view in accordance with one or more examples described in this disclosure.

The example techniques described in this disclosure are directed to rendering stereoscopic 3-dimensional (S3D) graphics during execution or run time. For example, an application may generate mono view images that are to be rendered by a graphics processing unit (GPU) for display. The techniques described in this disclosure may convert the mono view images to stereoscopic view images during the execution (i.e., during run-time) of the application.

In some examples, the techniques may render S3D graphics without needing any modification to the application that created the graphics or the GPU. In some examples, the techniques described in this disclosure may be implemented by an application processor executing a wrapper to a graphics driver. The wrapper to the graphics driver may be considered as a program that modifies inputs to a previously created graphics driver or modifies the outputs of the previously created graphics driver in accordance with the techniques described in this disclosure. In this way, the techniques described in this disclosure may provide for the GPU to generate S3D graphics without needing to modify the graphics driver that executes on the application processor. However, it may be possible to create a new graphics driver, or modify the previously created graphics driver, so that the application processor, in response to the execution of the graphics driver, implements the example techniques described in this disclosure. For purposes of illustration, the techniques are described as being performed by the application processor executing the graphics driver wrapper.

From the perspective of the application, the application processor executing the application may output graphics data and commands of the application for conventional 3D graphics rendering by GPU. The graphics driver wrapper, executing on the application processor, may modify the commands, as well as instructions that are executed by the GPU, such that the GPU renders S3D graphics on an S3D display. In this disclosure the terms "commands" and "instructions" may be used interchangeably. In this way, the GPU can render S3D graphics without any changes to the application that generates the graphics or to the GPU. Accordingly, the techniques described in this disclosure may allow for a viewer to experience S3D graphics for image content generated by applications that were not designed to generate S3D graphics.

Furthermore, the techniques described in this disclosure may account for the viewing angle (i.e., the angle at which the viewer is viewing the display) to determine the manner in which the application processor, via the graphics driver wrapper, modifies the instructions that are executed by the GPU. By accounting for the viewing angle, the viewer may experience high quality S3D graphics even if the display is tilted or the head of the viewer is titled.

In conventional 3D graphics rendering, the GPU generates 3D graphics from a single point of view (e.g., mono view). This single point of view may mean a single image that is viewable by both the right eye and left eye of a viewer. S3D graphics differs from 3D graphics in that S3D graphics generate stereoscopic view. The term stereoscopic view refers to images that are generated from a binocular point of view. In a binocular point of view, there may be two images, where one image is viewable by one of the eyes and not the other, and vice-versa. For example, when a viewer wears specialized glasses, the light that enters through the left lens of the glasses is viewable by the left eye, and not the right eye, and vice-versa. The binocular point of view may be referred to as stereoscopic view.

For example, in S3D graphics, the GPU may generate an image for the left-eye and another image for the right-eye (i.e., a stereoscopic view). The left-eye image is blocked from the right eye of the viewer and directed only to the left eye. The right-eye image is blocked from the left eye of the viewer and directed only to the right eye. The term stereoscopic view refers to two images (e.g., left-eye image and right-eye image) that are each displayed on the display, whereas mono view refers to a single image that is displayed on the display. The combination of the left-eye image and the right-eye image may appear to a viewer as if the image is popping out of or pushing into the display that is displaying the images. This may result in a more realistic and richer viewing experience.

In this disclosure, the concept of an S3D image (e.g., stereoscopic view) and a 3D image (e.g., mono view) should not be confused. A 3D image is an image that is constrained to a 2-dimensional (2D) area of a display. For example, in 3D graphics processing, an application defines 3D primitives, where the primitives form various objects of the application content. These objects form the single image (e.g., mono view) that is constrained to the 2D area of the display.

For instance, objects within a 3D image may appear further away or closer than other objects within the 3D image. However, all of these objects are limited to the 2D area of the display. An S3D image is a perceived image resulting from a brain of a viewer combining the right-eye and left-eye images. The resulting image (i.e., the S3D image) appears to not be constrained to the 2D area of the display. Rather, the S3D image appears to encompass a 3D volume, where the image appears to pop out of or push into the display. For instance, objects within the S3D image appear further away or closer than other objects within a 3D volume, and not a 2D area, as is the case with 3D images.

In other words, 3D graphics processing refers to generating a 3D image (e.g., by 3D primitives defined by an application) that appears to be constrained to the 2D area of the display. This 3D image is referred to as a mono view.

S3D refers to rendering for the creation of stereoscopic view, rather than mono view. In stereoscopic view, the right-eye and left-eye images are constrained to the 2D display; however, when the viewer views the stereoscopic view, the image appears to encompass a 3D volume.

The right-eye and left-eye images, that together form the S3D image, may be 3D images. It is the brain of the viewer that causes the viewer to perceive the S3D image when the brain combines the 3D right-eye image and the 3D left-eye image. For instance, when the viewer watches both the right-eye and left-eye images simultaneously, the viewer can perceive depth of the scene based on human binocular vision. The content of the right-eye image and left-eye images may be substantially similar to the content of the single 3D image.

For high quality stereoscopic effect, there may only be horizontal disparity between the left-eye image and the right-eye image. For instance, the location of an object in the left-eye image and the location of the object in the right-eye image may be different. However, the difference may only be in the horizontal direction, and not the vertical direction. It is the horizontal disparity between the objects that causes the binocular vision of the viewer to combine the left-eye image and right-eye image such that the objects appear to pop out of or pushed into the display. Any vertical disparity between the objects may diminish the S3D effect.

The techniques described in this disclosure an application processor, executing a graphics driver or a graphics driver wrapper, may modify instructions that cause the GPU to generate graphics content for a mono view to instructions that cause the GPU to generate graphics content for the stereoscopic view. In other words, prior to modification, the instructions may cause the GPU to generate a single 3D image. Subsequent to modification, the instructions may cause the GPU to generate two 3D images (e.g., the 3D left-eye image and the 3D right-eye image) of the stereoscopic view.

It should be noted that although the techniques described in this disclosure are generally disclosed for 3D images, aspects of this disclosure are not so limited. The techniques of this disclosure may be extended to 2D graphics as well. For example, the single image of the mono view may be a 2D image, and the techniques of this disclosure may modify instructions to cause the GPU to generate two 2D images for the stereoscopic view. In this case, the viewer will perceive a single image that is popped out of or pushed into the display that is displaying the two images for the stereoscopic view. To avoid confusion, the techniques described below refer to a single image for the mono view, and left-eye and right-eye images for the stereoscopic view, with the understanding that these images could be 3D images or 2D images.

The example techniques described in this disclosure the application processor, via the graphics driver or the graphics driver wrapper, may modify instructions issued by an application that are to be performed by the GPU and instructions of a vertex shader program that is to be executed by the GPU. For example, an application processor may execute the application. The application may have been designed to generate a single image (e.g., a mono view), and may generate the graphics content of the single image as a plurality of primitives. In addition, the application may determine pixel values, such as color, transparency, and coordinate values, for each vertex of the primitives.

During execution of the application (e.g., in run-time), the application, via the application processor, issues a command to retrieve instructions of the vertex shader program. The output of the vertex shader program, when executed, may be clipping coordinates for the vertices of primitives generated by the application for the single image (e.g., mono view). The example techniques may modify the instructions of the vertex shader program to generate clipping coordinates for the vertices of primitives for the left-eye image and the right-eye image (e.g., stereoscopic view). The clipping coordinates for the vertices of primitives for the left-eye image and the right-eye image may be based on the viewing angle.

The viewing angle refers to the angle with which a viewer is viewing a display upon which the left-eye and right-eye images are being displayed during the execution of the application (i.e., the viewer's viewing orientation relative to the display). There may be many different ways in which to determine the viewing angle. The techniques described in this disclosure are not limited to any particular manner in which to determine the viewing angle.

Also, during execution of the application, the application, via the application processor, issues a draw instruction to the GPU to instruct the GPU to draw one or more of the primitives within the single image. For instance, in the techniques of this disclosure, the application executing on the application processor outputs instructions as if the GPU is going to generate graphics content for a single image. The techniques described herein modify one or more of the instructions issued by the application, such as the draw instruction, to generate graphics content for the left-eye and right-eye images. In this way, there is no modification to the instructions from the perspective of the application.

For instance, the application processor, via the graphics driver wrapper, monitors the instructions issued by the application. When the application issues a draw instruction, the graphics driver wrapper captures such a draw instruction and issues two draw instructions, where one instruction is to generate graphic content for the left-eye image based on the viewing angle and one instruction is to generate graphics content for the right-eye image based on the viewing angle.

The viewing angle may not remain constant. For example, during execution of the application, the viewer may tilt the device, may tilt his or her head, or both. To account for the possibility of the changes in the viewing angle, the application processor may periodically determine the viewing angle. As one example, after the GPU outputs one combination of the left-eye image and the right-eye image, the techniques may determine the viewing angle. In this example, the graphics driver wrapper may modify the instructions of the vertex shader to account for the change in viewing angle for the next combination of left-eye image and right-eye image rendered by the GPU. Alternatively, the processor may continuously determine the viewing angle, and the graphics driver wrapper may utilize the current viewing angle to determine the manner in which to modify the instructions of the vertex shader.

As described above, the graphics driver wrapper may modify the instructions of the vertex shader to create vertices for primitives for both the left-eye image and right-eye image. For example, the techniques may cause the modified vertex shader to execute twice. In a first instance of execution, the modified vertex shader may displace the clipping coordinates of a vertex in a first direction based on the viewing angle, and in a second instance of execution, the modified vertex shader may displace the clipping coordinates of a vertex in a second direction based on the viewing angle. The GPU may process the vertices displaced in the first direction to render the left-eye image, and may process the vertices displaced in the second direction to render the right-eye image.

However, displacing all of the clipping coordinates in the first direction, and then displacing all of the clipping coordinates in the second direction may result a stereoscopic view in which all objects of the single image generated by the application appear popped out of or pushed into the display that is displaying the left-eye image and the right-eye image. For example, the primitives generated by the application may form different objects. By displacing the clipping coordinates of all of the primitives in the first direction to generate the left-eye image, and displacing the clipping coordinates of all of the primitives in the second direction to generate the right-eye image, all of the objects may appear popped out of or pushed into the display.

Such a result may not be ideal for human binocular vision. For example, the viewer may desire for the some of the objects to pop out more than other objects. As another example, even if all of the objects pop out or push into the display by the same amount, the viewer may desire to control the amount by which the objects pop out or push into the display.

As described in more detail, the application processor, via the graphics driver wrapper, may also modify the instructions of the vertex shader such that some of the objects pop out of or push into the display more than other objects. In some examples, in addition to or instead of modifying the instructions of the vertex shader to allow some objects to pop out or push into the display more than other objects, the application processor, via the graphics driver wrapper, may modify instructions that increase or decrease the horizontal disparity between the left-eye image and the right-eye image. In this manner, the viewer may be able to control the amount by which the stereoscopic view pops out of or pushes into the display.

FIG. 1 is a conceptual diagram illustrating a display that is displaying stereoscopic view in accordance with one or more examples described in this disclosure. FIG. 1 illustrates device 10. Examples of device 10 include, but are not limited to, mobile wireless telephones, personal digital assistants (PDAs), video gaming consoles that include video displays, mobile video conferencing units, laptop computers, desktop computers, television set-top boxes, digital media players, a tablet computing device, smartphones, and the like. Device 10 includes display 12. Examples of display 12 include, but are not limited to, a liquid crystal display (LCD), an organic light emitting diode display (OLED), a cathode ray tube (CRT) display, a plasma display, a polarized display, or another type of display device. Display 12 may be any type of display that is configured to display stereoscopic view (e.g., a left-eye image and a right-eye image).

As illustrated, display 12 displays 3D image 14A and 3D image 14B. FIG. 1 illustrates image 14A as a solid box, and image 14B as a dashed box. Image 14A and image 14B may each be a 3D image. For example, if each one of image 14A and 14B is viewed individually, image 14A and 14B would not appear to pop out or push into display 12 (e.g., appear as if mono view).

However, when image 14A and image 14B are viewed together, image 14A and image 14B together form a stereoscopic view. For example, image 14A and image 14B may include similar image content, but are displaced on display 12. Specialized glasses worn by a viewer may block the right eye of the viewer from seeing image 14A, and allow the left eye of the viewer to see image 14B. The specialized glasses may also block the left eye of the viewer from seeing image 14B, and allow the right eye of the viewer to see image 14A. When the viewer views images 14A and 14B together the horizontal disparity between images 14A and 14B may result in the viewer perceiving an S3D image (i.e., one that appears to be behind display 12 or ahead of display 12 and encompasses a 3D volume). In other words, image 14A is the left-eye image of the stereoscopic view, and image 14B is the right-eye image of the stereoscopic view.

An application executing on a processor of device 10 may generate a single image (e.g., mono view). For example, the processor, executing the application, may generate the image content of the single image as a plurality of primitives. The image content of this single image may be similar to the image content of image 14A and image 14B. In addition, the processor, executing the application, may determine pixel values, such as color, transparency, and coordinate values, for each vertex of the primitives. The pixel values of the primitives may be referred to as image data. The processor, executing the application, may output the image data and instructions to a graphics processing unit (GPU) of device 10 instructing the GPU to render the single image.

In accordance with the techniques described in this disclosure, the processor may capture the commands to the GPU that command the GPU to render the single image. For example, the processor may execute a graphics driver or a graphics driver wrapper, and the processor may capture the commands to the GPU, via the graphics driver or the graphics driver wrapper, to render the single image. For purposes of illustration, the techniques are described as being performed by the processor executing the graphics driver wrapper. In general, the techniques describe the graphics driver wrapper performing various functions for ease of description. However, it should be understood that the processor is implementing the techniques via the execution of the graphics driver wrapper.

For example, the graphics driver wrapper may be a program executing on the processor. The graphics driver wrapper may modify the instructions that the graphics driver receives or the instructions that the graphics driver outputs to such that the modified instructions cause the GPU to render stereoscopic view. Accordingly, the techniques described in this disclosure may not require any modification to the graphics driver. Rather, the processor may execute the graphics driver wrapper and execute a previously developed graphics driver. However, it may be possible to modify existing graphics drivers or create new graphics drivers to implement the techniques described in this disclosure.

The processor executing the graphics driver wrapper may modify the commands issued by the processor and cause the GPU to render two images that form the stereoscopic view (e.g., image 14A and image 14B). In addition, the processor executing the graphics driver wrapper may modify instructions of a shader program (e.g., a vertex shader) that executes on the GPU. For example, the graphics driver wrapper may modify the instructions of the vertex shader such that the modified vertex shader, when executed on the GPU, displaces a position of a pixel in the single image generated by the application executing on the processor. The graphics driver wrapper may cause the GPU to execute the modified vertex shader twice. In the first execution of the modified vertex shader, the modified vertex shader displaces the positions of the pixels in the single image in one direction. In the second execution of the modified vertex shader, the modified vertex shader displaces the positions of the pixels in the single image in another direction in the second execution. Image 14A may be the resulting image from the vertex shader displacing pixels of the single image in one direction. Image 14B may be the resulting image from the vertex shader displacing pixels of the single image in another direction.

In modifying the instructions of the vertex shader, the processor executing the graphics driver wrapper may account for the viewing angle. The viewing angle is the angle at which the viewer is viewing display 12. For example, in FIG. 1, display 12 may be considered to be in the landscape mode. If the viewer is viewing straight ahead at display 12 (i.e., the viewer has not tilted his or her head), the viewing angle may be considered to be zero. If, however, the viewer tilts device 10 or tilts his or her head, the viewing angle may no longer be zero. For instance, if the viewer rotates device 10 to be in portrait mode (e.g., tilts device 10 by 90°), the viewing angle may be 90°.

It should be understood that the viewing angle being zero in landscape mode, and 90° in portrait mode is provided for purposes of illustration and should not be considered limiting. The techniques described in this disclosure also apply to situations where the viewing angle is zero in the portrait mode and 90° in the landscape mode, or any mode in between landscape and portrait mode.

In general, a processor of device 10 may determine the viewing angle, and the processor, via the graphics driver wrapper executing on the processor, may modify the instructions outputted by the application to the GPU and instructions of a shader program executing on the GPU based on the viewing angle. The graphics driver wrapper may modify the instructions such that the GPU renders two images that form the stereoscopic view, rather than the single image that forms the mono view.

Figure 2:
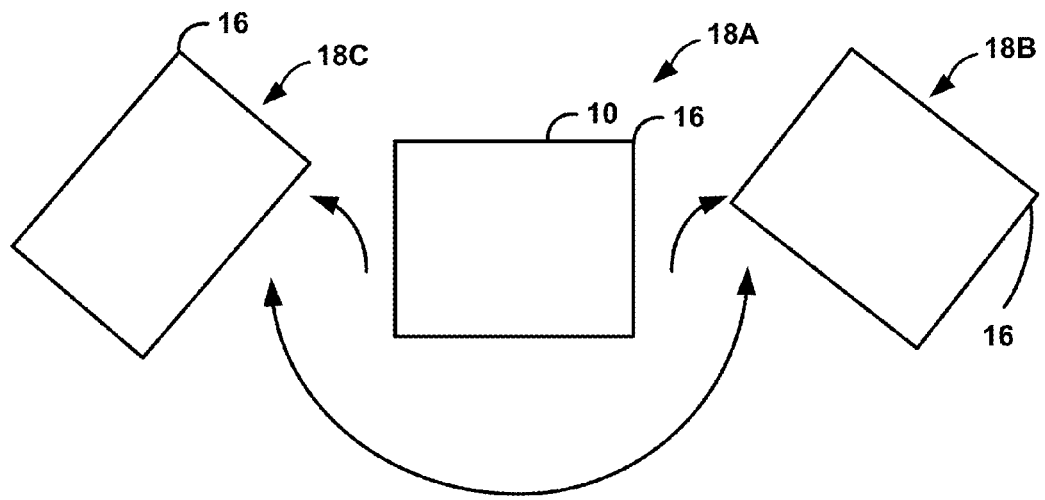
FIG. 2 is a conceptual diagram illustrating different viewing angles.

FIG. 2 is a conceptual diagram illustrating different viewing angles. For purposes of illustration, FIG. 2 illustrates different angles to which the viewer may tilt device 10. However, the techniques described in this disclosure may also be extendable to examples where the viewer does not tilt device 10, but, rather, tilts his or her head, or a combination of the two.

Most stereoscopic 3D displays have to be used with a constraint on device orientation. For example, most all 3D televisions are viewed in landscape mode. This is reasonable for many devices that are setup for use on a horizontal surface (TV cabinet, desktop, etc.). However, for handheld devices, such as phones and tablets, a viewer may view the display in either landscape or portrait modes, or even with any angular orientation.

For example, in position 18A, device 10 is in the landscape mode. For ease of description, FIG. 2 illustrates orientation point 16, which is located at the top-right corner of device 10, when device 10 is in the landscape mode. The viewer may tilt device 10 by 45° (i.e., from position 18A to position 18B). In this case, FIG. 2 illustrates that orientation point 16, in position 18B, moved in the right, bottom direction relative to orientation point in position 18A. In this example, the viewing angle may be considered as 45°.

As another example, the viewer may tilt device 10 by −45° (i.e., from position 18A to position 18C). In this case, FIG. 2 illustrates that orientation point 16, in position 18C, moved in the left, top direction relative to orientation point in position 18A. In this example, the viewing angle may be considered as −45°. Because the viewer may tilt device 10 by any amount, the viewing angle may range from −180° to 180°.

For example, landscape and portrait are two typical display modes (e.g., the viewer rotates device 10 from the landscape more to portrait mode, or vice-versa). In these cases, device 10 may determine whether device 10 is in landscape mode or portrait mode, and the processor, via the graphics driver wrapper, may modify instructions to cause the GPU to render the left-eye image and the right-eye image for the landscape mode or portrait mode. However, the viewer may orient device 10 in any angle, and not just in landscape mode or portrait mode. Accordingly, the processor may account for the viewing angle to determine the manner in which to modify the instructions that are executed on the GPU.

There may be various ways in which to determine the viewing angle. For example, device 10 may include an accelerometer that device 10 uses to determine whether to switch from landscape mode to portrait mode. Device 10 may also include either single- or multi-axis models of the accelerometer to detect magnitude and direction of the proper acceleration. Such an accelerometer may output orientation based on direction of weight changes. The processor of device 10 may determine the viewing angle based on the output orientation.

As another example, device 10 may include a gyroscope. The gyroscope may provide a measure of orientation based on the principles of conservation of angular momentum. The processor of device 10 may determine the viewing angle based on the measure of orientation provided by the gyroscope. Gyroscopes based on other operating principles also exist, such as the electronic, microchip-packaged MEMS gyroscope devices used in consumer electronic devices. The gyroscope may provide a more accurate recognition of movement within a 3D space than the accelerometer.

The outputs of the accelerometer or gyroscope may allow the processor to determine a reasonable estimation of the viewing angle. However, the estimation of the viewing angle may be based on an assumption that the viewer is oriented in a particular manner such as vertically (e.g., the viewer did not tilt his or her head). In other words, the accelerometer or gyroscope may provide an accurate measure of the display orientation, which may be sufficient to determine a reasonable estimation of the viewing angle, but may not provide an accurate measure of the viewer orientation.

In some examples, it may be possible for the processor of device 10 to determine the orientation of the viewer (e.g., whether the viewer is oriented vertically, or whether the viewer tiled his or her head). For example, either display 12 or device 10 may include a built-in front-facing camera. With the front-facing camera, a camera processor may detect the eyes of the viewer or the head orientation of the viewer relative to display 12. The processor of device 10 may determine the viewing angle based on the detected eyes or head orientation, as detected by the camera processor.

Besides normal optical camera, other sensors may also be configured to detect eyes or head orientation of the viewer. In general, the techniques described in this disclosure may utilize any technique to determine the viewing angle, including techniques that do not necessarily rely upon detecting the eyes or head of the user. The techniques described in this disclosure should not be considered limited to the examples described above for determining the viewing angle.

For example, the techniques described in this disclosure may only determine the viewing angle based on the outputs of the accelerometer and/or gyroscope. As another example, the techniques described in this disclosure may determine the viewing angle based only the detected eyes or head of the user. As another example, the techniques described in this disclosure may determine the viewing angle based on the outputs of the accelerometer and/or gyroscope, and based on the detected eyes or head of the user. As another example, the techniques may determine the viewing angle based on the outputs of the accelerometer and/or gyroscope and based on one or more other sensors that are configured to determine the viewing orientation of the user. Any permutation and combination of the above, as well as any other techniques, may be used to determine the viewing angle.

Figure 3:
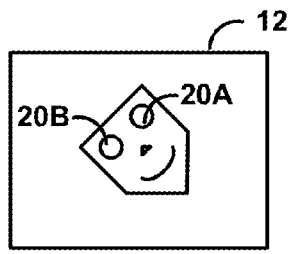
FIG. 3 a conceptual diagram illustrating the detection of eyes and head orientation of a viewer.

FIG. 3 a conceptual diagram illustrating the detection of eyes and head orientation of a viewer. In FIG. 3, display 12 of device 10 displays the face captured by a camera of device 10. It should be understood that display 12 does not need to display the image captured by the camera to determine the viewing angle, and FIG. 3 illustrates display 12 displaying the face captured by the camera for ease of illustration.

As illustrated in FIG. 3, device 10 is in landscape mode; however, the head of the viewer is tilted. In this case, the camera processor of device 10 may detect the orientation of eyes 20A and 20B, and transmit the orientation of eyes 20A and 20B to the processor of device 10. Based on the orientation of eyes 20A and 20B, the processor of device 10 may determine the viewing angle. In accordance with the techniques described in this disclosure, the graphics driver wrapper may modify instructions that execute on the GPU based on the determined viewing angle.

Figure 4:
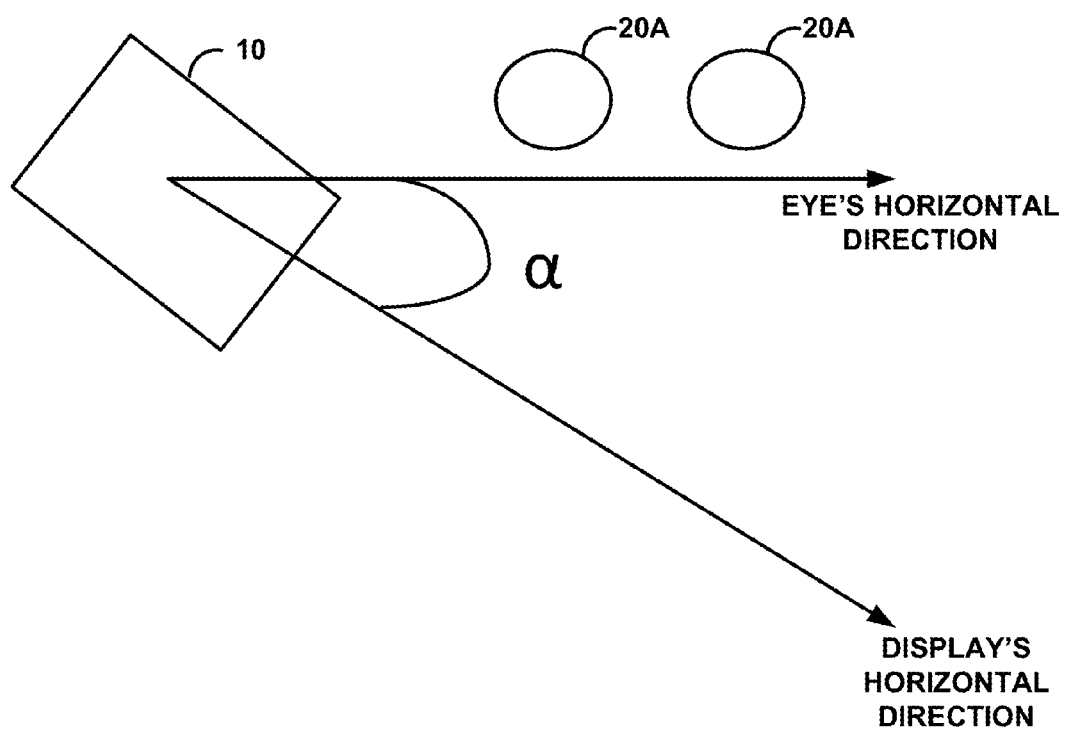
FIG. 4 is a conceptual diagram illustrating an example of a viewing angle.

FIG. 4 is a conceptual diagram illustrating an example of a viewing angle. In FIG. 4, the viewing angle is labeled as alpha (α). The viewing angle is the relationship between the viewing orientation of the viewer and the orientation of the display. For example, alpha is a measure of the angle formed by the eye's horizontal direction and the display's horizontal direction. The display's horizontal direction refers to the horizontal plane relative to the orientation of the display, and eye's horizontal direction refers to the horizontal plane relative to the orientation of eyes 20A and 20B of the viewer. In FIG. 4, the viewer is viewing display 12 straight (e.g., there is no tilt in the viewer's head). Accordingly, the eye's horizontal direction is a horizontal line. In FIG. 4, device 10 is tilted at an angle, and is not in landscape mode or portrait mode. Accordingly, the display's horizontal direction is horizontal relative to device 10, but an angled line relative to eye's horizontal direction.

Figure 5:
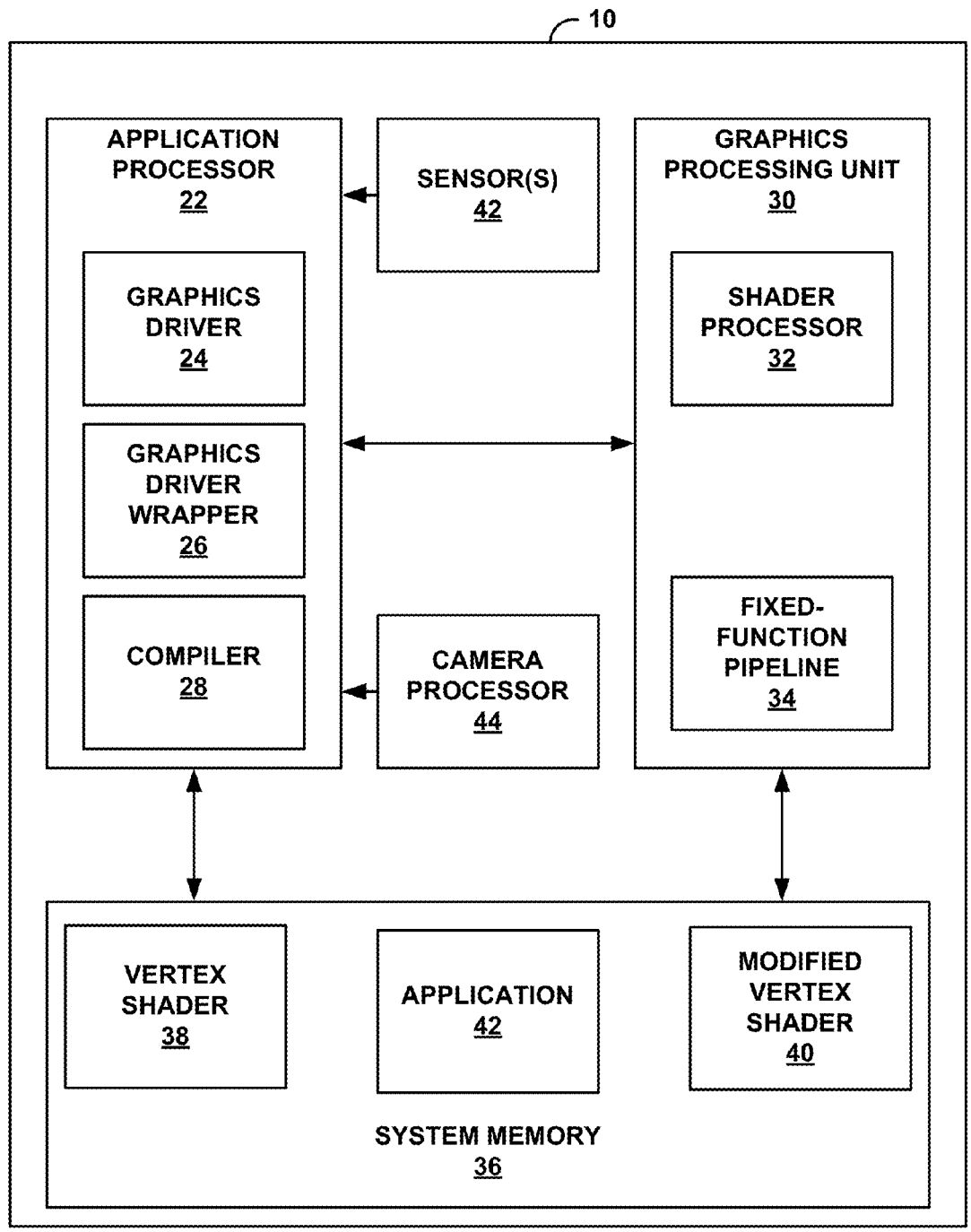
FIG. 5 is a block diagram illustrating an example of a device that may implement one or more example techniques described in this disclosure.

FIG. 5 is a block diagram illustrating an example of a device that may implement one or more example techniques described in this disclosure. For instance, FIG. 5 illustrates device 10 in further detail. As illustrated in FIG. 5, device 10 may include application processor 22, graphics processing unit (GPU) 30, system memory 36, one or more sensors 42 and camera processor 44. Device 10 may include components in addition to those illustrated in FIG. 5.

Moreover, in some examples, application processor 22, GPU 30, and camera processor 44 may be formed as a common integrated circuit that is housed within a single circuit package (e.g., formed as a common processor). However, aspects of this disclosure are not so limited, and one or more of application processor 22, GPU 30, and camera processor 44 may be separate integrated circuits that are housed in separate circuit packages.

One or more sensors 42 may be configured to output a measure of the orientation of device 10 to application processor 22. Examples of one or more sensors 42 include an accelerometer and a gyroscope. Camera processor 44 may receive image data from images captured by a camera (not shown) of device 10 or a camera (not shown) of display 12. In the techniques described in this disclosure, the camera may be configured to continuously capture images without user-intervention and in the background. For instance, the captured images do not need to be displayed or stored for later retrieval. From the captured images, camera processor 44 may determine the orientation of the viewer.

Camera processor 44 may determine the orientation of the eyes of the viewer to determine the orientation of the viewer. Camera processor 44 may implement any technique to identify the eyes of the viewer from which camera processor 44 determines the orientation of the eyes of the viewer. Many, current camera processors are configured to identify the eyes of the viewer, and these current camera processors may be one example of camera processor 44.

One or more sensors 42 may output the measure of the orientation of device 10 to application processor 22. Camera processor 44 may output the measure of the viewer orientation to application processor 22. Application processor 22 may determine the viewing angle based at least on the measure of the orientation of device 10 and the measure of the orientation of the viewer. For example, application processor 22 may determine the viewing angle to be the angle between the orientation of device 10 and the orientation of the viewer. As described in more detail, application processor 22 may utilize the viewing angle to determine the manner in which to modify instructions of vertex shader 38.

Camera processor 44 may not be necessary in every example. For instance, the measure of the orientation of device 10 may be sufficient for application processor 22 to determine the viewing angle. In these examples, application processor 22 may be preconfigured with a measure of the viewer orientation. Application processor 22 may determine the viewing angle based on the measure of the orientation of device 10 and the preconfigured measure of the viewer orientation. As another example, application processor 22 may determine the viewing angle based on the measure of the orientation of the viewer without using the outputs of one or more sensors 42. In this example, application processor 22 may be preconfigured with the orientation of device 10 (e.g., may be preconfigured to determine that the orientation of device 10 is landscape when not using the outputs of one or more sensors 42).

Utilizing one or more sensors 42 and camera processor 44 to determine the viewing angle is provided for purposes of illustration only, and should not be considered limiting. There may other ways in which application processor 22 may determine the viewing angle, and the techniques described in this disclosure are extendable to such other techniques.

In some examples, application processor 22 may determine the viewing angle once per generation of the stereoscopic view because the viewer may change the viewing angle. For example, GPU 30 may output rendered images such as the left-eye image and the right-eye image of the stereoscopic view. After every output of both the left-eye image and the right-eye image, application processor 22 may determine the viewing angle. As another example, application processor 22 may continuously determine the viewing angle. As described in more detail, application processor 22, via graphics driver wrapper 26, may modify the instructions of vertex shader 38 based on the current, determined viewing angle such that when vertex shader 38 processes the next image, vertex shader 38 may generate clipping coordinates for the next left-eye image and the next right-eye image as determined by application processor 22.

Application processor 22 may be the central processing unit (CPU) of device 10. GPU 30 may be a processing unit operable to output graphics data for presentation on a display. Examples of application processor 22, GPU 30, and camera processor 44 include, but are not limited to, a digital signal processor (DSP), a general purpose microprocessor, application specific integrated circuit (ASIC), field programmable logic array (FPGA), or other equivalent integrated or discrete logic circuitry.

In some examples GPU 30 may be specialized hardware that is specifically designed for graphics processing. For example, graphics processing may require fast parallel processing, and GPU 30 may be specifically designed for such fast parallel processing. It may be possible for GPU 30 to perform tasks in addition to graphics processing, such as general processing task. Accordingly, GPU 30 may be considered as a general processing GPU (GPGPU). The techniques described in this disclosure may apply to examples where GPU 30 performs only graphics related tasks or examples where GPU 30 is a GPGPU.

System memory 36 may be an example of a computer-readable storage medium. For example, system memory 36 may store instructions that cause application processor 22 and GPU 30 to perform functions ascribed to each in this disclosure. System memory 36 may be considered as a computer-readable storage medium comprising instructions that cause one or more processors (e.g., application processor 22 or GPU 30) to perform various functions.

Examples of system memory 36 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 36 may, in some examples, be considered as a non-transitory storage medium. The term "non-transitory" may indicate that the storage medium is not embodied in a carrier wave or a propagated signal. However, the term "non-transitory" should not be interpreted to mean that system memory 36 is non-movable. As one example, system memory 36 may be removed from device 10, and moved to another device. As another example, a storage device, substantially similar to system memory 36, may be inserted into device 10. In certain examples, a non-transitory storage medium may store data that can, over time, change (e.g., in RAM).

GPU 30 may include shader processor 32 and fixed-function pipeline 34. Shader processor 32, sometimes referred to as a shader core, may be a core of GPU 30 upon which shader programs such as vertex shaders and fragment shaders execute. Fixed-function pipeline 34 may include hardware units that perform fixed functions. In other words, the shader programs such as vertex shaders and fragment shaders may be software units that execute on shader processor 32 and allow for functional flexibility, whereas fixed-function pipeline 34 includes hardware units with fixed functions and minimal functional flexibility.

For example, some earlier versions of GPU included only fixed-function units in a graphics pipeline. In GPU 30, the fixed-function graphics pipeline of earlier version of the GPU is partially replaced by vertex shaders, such as vertex shader 38, and fragment shaders. For example, vertex shader 38 may perform functions such as model view transformation, lighting, and projection, which were performed by fixed-function units in earlier versions of GPUs. The fragment shaders may perform the functions of the fragment stage of the fixed-function units in earlier versions of GPUs.

The example techniques described in this disclosure may modify shader programs that are designed to generate a single three-dimensional (3D) image (e.g., for a mono view), such that when the modified shader programs are executed on shader processor 32, GPU 30 generates graphics data for S3D images (e.g., a stereoscopic view) based on a viewing angle. Again, as discussed above, stereoscopic view includes a left-eye image and a right-eye image. The left-eye image and the right-eye image include substantially similar graphics content as the mono view image; however, one or more corresponding pixels of the left-eye and right-eye images may be displaced along the horizontal axis relative to one another.

For example, imagine that the right-eye image is placed on top of the left-eye image. In this case, all of the content in the right-eye image may not line up perfectly with the identical content in the left-eye image. Rather, one or more objects in the right-eye may be to the left or to the right of the identical objects in the left-eye image (e.g., there may be horizontal disparity between the objects in the right-eye image and left-eye image). For high quality stereoscopic effect, there may not be vertical disparity between the objects in the right-eye image and left-eye image.

The left-eye image is viewable by the left eye of the viewer, and the right-eye image is blocked from the left eye of the viewer. The right-eye image is viewable by the right eye of the viewer, and the left-eye image is blocked from the right eye of the viewer. In some examples, the viewer may wear specialized glasses that block the left-eye image from being viewable by the right eye, and the right-eye image from being viewable by the left eye. However, aspects of this disclosure do not necessarily require a viewer to wear specialized glasses. For example, some displays do not require the viewer to wear specialized glasses to experience stereoscopic view. Techniques of this disclosure may be extended to such displays.

GPU 30 may generate the graphics data for the left-eye image and the right-eye image such that when the viewer views both the left-eye image and the right-eye image at the same time the brain of the viewer causes the viewer to perceive an image that pops out of the display or pushes into the display displaying the two images (e.g., appears to be ahead of or behind the display). This popping out or pushing in is due to the brain of the viewer resolving the horizontal discrepancies in the two images of the stereoscopic view with substantially similar content. For example, the binocular vision of the viewer causes the viewer to view both the left-eye image and the right-eye image at the same time, and the viewer resolves the horizontal discrepancies in the left-eye and right-eye images by perceiving depth.

As an example, application processor 22 may execute one or more applications, such as application 42, stored in system memory 36. Examples of application 32 include, but are not limited to, web browsers, user interfaces, e-mail applications, spreadsheet applications, word processing applications, graphics authoring applications, video games, or other applications that generate viewable objects for display. For instance, application 42 may be a video game that when executed outputs graphical content that is displayed on a display.

Application 42 may be designed by a developer for mono view. For example, application 42, upon execution, may generate 3D graphics content, where the 3D graphics content is constrained to the 2D area of the display. Application 42, upon execution on application processor 22, may divide the generated 3D graphics content into primitives such as triangles, rectangles, or other types of polygons. Each of these primitives may include pixels that are to be displayed on the display. For example, these primitives may form the objects within the image. Application 42, upon execution on application processor 22, may also assign pixel values to each of the vertices of the primitives. For example, the pixel values may include 3D coordinates of the vertices, color values of the vertices, and transparency values of the vertices. The pixel values need not include all of the above example components in every aspect of this disclosure.

Application processor 22 may then forward the pixel values for the vertices to GPU 30 for further processing. For example, application processor 22 may include graphics driver 24, which may be software executing on application processor 22. Application processor, via graphics driver 24, may be configured to transmit commands to GPU 30, and in response, GPU 30 may perform functions in accordance with the received commands. For example, graphics driver 24 functions as an interface between GPU 30 and application processor 22. When application processor 22 issues a command to GPU 30, it is through graphics driver 24 that GPU 30 receives the command. For instance, application 42, executing on application processor 22, may instruct GPU 30 to perform a particular task. In this case, graphics driver 24 may receive the instruction from application 42 for the particular task, and application processor 22 may provide the instruction to GPU 30. In response, GPU 30 may perform the task.

In some examples, graphics driver 24 may be designed in accordance with a specific application programming interface (API). For example, graphics driver 24 may be designed according to the OpenGL or OpenGL ES (embedded system) APIs, which are APIs of the Khronos Group and their specifications are available publicly. However, the techniques of this disclosure may be extendable to the Microsoft DirectX system, such as DirectX 9, 10, or 11, or any other shader-based graphics system and APIs. For purposes of illustration, the techniques of this disclosure are described in the context where the API is the OpenGL ES 2.0 API. However, aspects of this disclosure are not so limited, and can be extended to other APIs or shader-based graphics systems.

To render the primitives received from application processor 22, shader processor 32 of GPU 30 may execute one or more shader programs such as vertex shaders and fragment shaders to generate the pixel values for the pixels of a display. A developer may develop these vertex shaders and fragment shaders in accordance with an API, such as the OpenGL ES 2.0 API used in this disclosure for illustration purposes. The source code for these vertex and fragment shaders may be stored in system memory 36.

For example, application 42 may utilize vertex shader 38, which may be configured to operate on the image of the mono view generated by application 42. The pixel values of the image of the mono view generated by application 42 may need to be processed by shader processor 32 using vertex shader 38. As one example, vertex shader 38 may be a vertex shader particularly called by application 42 during the execution of application 42 on application processor 22. Vertex shader 38 may execute on shader processor 32 of GPU 20, and application 42 may execute on application processor 22, but vertex shader 38 and application 42 may be interrelated for the purposes of displaying the images generated by application 42.

The source code of vertex shader 38 may be stored in system memory 36. Application processor 22, via graphics driver 24, may retrieve the source code of vertex shader 38 and provide the source code for vertex shader 38 to compiler 28. Compiler 28 may compile the source code of vertex shader 38 to generate object code of vertex shader 38, and store the object code in system memory 38. Application processor 22, via graphics driver 34, may then instruct GPU 30 to retrieve the object code of vertex shader 38 from system memory 36, and instruct GPU 30 to execute the object code of vertex shader 38 on shader processor 32. Shader processor 32 may then execute the object code of vertex shader 38 to process the pixel values for the vertices generated by the execution of application 42. GPU 30, in conjunction with fixed-function pipeline 34 and shader processor 32, may generate the graphics content for application 42 for display.

Although system memory 36 is shown to store source code for only one vertex shader 38, aspects of this disclosure are not so limited. For example, application 42 may possibly utilize multiple different vertex shaders, and the source code for each of these vertex shaders may be stored in system memory 36. For example, the vertex shaders may be content dependent and even scene dependent, and application 42 may utilize a particular shader based on the content or scene of the image that is to be rendered. Also, application 42 may require execution of multiple instantiations of vertex shader 38. For example, shader processor 32 may execute multiple instantiations of vertex shader 38 at the same time (e.g., in parallel), where each instantiation of vertex shader 38 performs substantially similar functions, but on different pixel values. System memory 36 may similarly store source code for fragment shaders. Graphics driver 34 may retrieve the source code for the fragment shaders, and compiler 28 may compile the source code to generate object code for the fragment shaders in a manner similar to that described above for vertex shader 38.

As will be described in further detail, one or more example techniques of this disclosure may modify vertex shader 38 (e.g., the source code of vertex shader 38) based on the viewing angle prior to the compilation. Compiler 28 may compile the modified source code to generate object code of modified vertex shader 40. Shader processor 32 may execute the object code of modified vertex shader 40, which may cause GPU 30 to generate stereoscopic 3D graphics content (e.g., the graphics content for the left-eye image and the right-eye image of S3D). However, prior to describing the modification to vertex shader 38, the following describes example functionality of vertex shader 38, which may assist in the understanding of the modification applied to the source code of vertex shader 38. Furthermore, in this disclosure the terms "command" and "instruction" may be used interchangeably.

As described above, application processor 22, via application 42, may generate coordinates for the vertices of the primitives. These coordinates may be referred to as world coordinates, and may be specific to application 42. In other words, the coordinates of the vertices, as defined by application 42, may not necessarily be coordinates of the display upon which the primitives are displayed and may also possibly be coordinates for vertices that are outside of a viewable area. Vertex shader 38 may be designed to convert the world coordinates, which may be in 3D, into 2D coordinates of the display (e.g., display coordinates). To perform this function, vertex shader 38 may transform the world coordinates into eye coordinates, and then to clipping coordinates. For example, the output of vertex shader 38, when executed, may be the clipping coordinates of the vertices. The final display coordinates (e.g., the coordinates of the display) may be determined subsequently as part of the fixed-function pipeline 34.

The clipping coordinates may define a view frustum. The view frustum may define the viewable area of the 3D graphics content. GPU 30 may utilize the view frustum to cull pixels which reside external to the view frustum. For example, a fixed-function unit of fixed-function pipeline 34 (e.g., a frustum unit of fixed-function pipeline 24) may cull pixels which reside external to the view frustum, as defined by the clipping coordinates generated by vertex shader 38.

The equation to calculate the clipping coordinates from the world coordinates may be:

$$Vclip = PRJ * Veye = PRJ * MVT * Vworld, \quad \text{(equation 1)}$$

where Vclip is the vertex clip coordinates, Veye is the vertex eye coordinates, Vworld is the vertex world coordinates provided by application 42, PRJ is a projection matrix, and MVT is a model view transformation matrix (or world view transformation matrix). In some examples, the PRJ and MVT matrices may be combined into a single matrix. However, for ease of understanding, these matrices are described separately.

The projection matrix (PRJ) and model view, or world view, transformation matrix (MVT) may be defined by the API. The terms model view and world view may be used interchangeably. Vclip, Veye, and Vworld may include four components (e.g., x, y, z, and w coordinates).

The Vclip, Veye, and Vworld matrices may be represented as:

$$V_{clip} = \begin{bmatrix} x_{clip} \\ y_{clip} \\ z_{clip} \\ w_{clip} \end{bmatrix}, \quad V_{eye} = \begin{bmatrix} x_{eye} \\ y_{eye} \\ z_{eye} \\ w_{eye} \end{bmatrix}, \quad V_{world} = \begin{bmatrix} x_{world} \\ y_{world} \\ z_{world} \\ w_{world} \end{bmatrix} \quad \text{(equation 2)}$$

The OpenGL, OpenGL ES, and OpenGL ES 2.0 APIs, with programmable shaders, define the PRJ matrix as:

$$PRJ = \begin{bmatrix} \frac{2z_{near}}{(R-L)} & 0 & \frac{R+L}{R-L} & 0 \\ 0 & \frac{2z_{near}}{T-B} & \frac{T+B}{T-B} & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix}, \quad \text{(equation 3)}$$

where L and R specify the coordinates for the left and right vertical clipping planes, respectively, B and T specify the coordinates for the bottom and top horizontal clipping planes, respectively, and $z_{near}$ and $z_{far}$ specify the distances to the near and the far depth clipping planes, respectively.

In some examples, the clipping planes may be symmetrical. For example, −L may be equal to R, and −B may be equal to T. In these instances, the PRJ matrix may simplify to:

$$PRJ = \begin{bmatrix} \frac{2z_{near}}{(R-L)} & 0 & 0 & 0 \\ 0 & \frac{2z_{near}}{T-B} & 0 & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix} \quad \text{(equation 4)}$$

The OpenGL, OpenGL ES, and OpenGL ES 2.0 APIs, with programmable shaders, define the MVT matrix as:

$$MVT = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix} \quad \text{(equation 5)}$$

All of the variables of the PRJ and MVT matrices may be defined by application 42 executing on application processor 22, and graphics driver 24 may provide these variables to shader processor 32 that is executing the object code of vertex shader 38. As can be seen from equations 1, 4, and 5, with these variables, vertex shader 38 may determine the Vclip coordinates for each of the vertices. GPU 30 may utilize the clip coordinates for the vertices and perform further functionality, in conjunction with the functionality of fixed-function pipeline 34 and fragment shaders, to render an image for display. In this manner, GPU 30 may generate a mono view for the graphics content generated by application 42.

In accordance with techniques of this disclosure, while vertex shader 38 may utilize the variables for the MVT and PRJ matrices to determine the Vclip coordinates, the MVT and PRJ matrices may not be needed to modify vertex shader 38 (e.g., modify the source code of vertex shader 38) to generate the stereoscopic view. In other words, the instructions that the techniques described in this disclosure modify may not require the specific values of the MVT and PRJ matrices.

For example, there may be many ways in which to design vertex shader 38, and vertex shader 38 may be content and even scene dependent allowing content developers to utilize many different ways to program vertex shader 38. Accordingly, it may not be feasible to determine the specific ways in which the MVT and PRJ matrices are defined by the developer. However, the techniques described in this disclosure do not require knowledge of the manner in which the developer developed vertex shader 38 or the manner in which the developer defined the MVT and PRJ matrices.

The example above describes one way in which to determine the Vclip coordinates for the mono view. There may be many different techniques to calculate the clipping coordinates, and in general, it may be immaterial the particular technique utilized to calculate the clipping coordinates. However, in any event, for 3D graphics content, clipping coordinates (Vclip) may need to be calculated regardless of the technique used to calculate the clipping coordinates. For example, it may even be possible for application processor 22 to determine the clipping coordinates, and graphics driver 24 may provide the clipping coordinates to shader processor 32 that is executing the object code of vertex shader 38. In this example, the PRJ and MVT matrices may be unity matrices. For example, application processor 22 may perform the matrix multiplication of equation 1 and provide the results to shader processor 32. In this example, shader processor 32 may multiply received values with a unity matrix to generate the Vclip coordinates for each of the vertices generated by application 42.

However, in any case (e.g., where shader processor 32 executing vertex shader 38 determines the clipping coordinates or where shader processor 32 executing vertex shader 38 receives the clipping coordinates), vertex shader 38 may utilize a specific variable to store the clipping coordinates. The specific variable may be particular to the API for which vertex shader 38 is designed. For example, if vertex shader 38 is designed in accordance with the OpenGL, OpenGL ES, or OpenGL ES 2.0 APIs, with programmable shaders, vertex shader 38 may store the clipping coordinates in the gl_Position variable. The gl_Position variable may be declared automatically. There may be a similar variable in other graphics APIs. If vertex shader 38 is designed in accordance with the OpenGL, OpenGL ES, or OpenGL ES 2.0 APIs, with programmable shaders, vertex shader 38 may include instructions such as: gl_Position.x=$x_{clip}$, gl_Postion.y=$y_{clip}$, gl_Position.z=$z_{clip}$, and gl_Position.w=$w_{clip}$, where, as indicated above in equation 2, $$V_{clip} = \begin{bmatrix} x_{clip} \\ y_{clip} \\ z_{clip} \\ w_{clip} \end{bmatrix}.$$

In one or more example techniques described in this disclosure, graphics driver wrapper 26, which may be software executing on application processor 22, may modify the instructions of vertex shader 38 that define the clipping coordinates for the mono view to define clipping coordinates for the stereoscopic view (e.g., clipping coordinates for the left-eye image and clipping coordinates for the right-eye image). For example, graphics driver wrapper 26 may receive the determined viewing angle from application processor 22. Application processor 22, due to the execution of graphics driver wrapper 26, may be configured to modify the instructions of vertex shader 38 based on the viewing angle determined by application processor 22 to define clipping coordinates for the stereoscopic view.

For example, application processor 22, via graphics driver wrapper 26, may modify the instructions of vertex shader 38 such that when the modified instructions of vertex shader 38 are executed a first time by shader processor 32, the modified instructions of vertex shader 38 displace the clipping coordinates in one direction based on the viewing angle, and when the modified instructions of vertex shader 38 are executed a second time by shader processor 32, the modified instructions of vertex shader displace the same clipping coordinates in another direction based on the viewing angle. However, simply displacing the clipping coordinates in different directions, and rendering the resulting images may cause the stereoscopic view to always pop out of display 12 or always push into display 12 by a certain fixed amount. Such a result may not be pleasing to the viewer.

For example, assume that the stereoscopic view pops out of display 12. In this case, the viewer may perceive the stereoscopic view on a plane that is a certain distance in front of display 12. This plane where the viewer perceives the stereoscopic view may be referred to as a zero disparity plane (ZDP). However, the viewer may desire to perceive the zero disparity plane at a distance different than the current zero disparity plane.

For zero disparity plane adjustment, application processor 22, via graphics driver wrapper 26, may increase or decrease the horizontal disparity between the left-eye image and the right-eye image. For example, application 42 may output a command that defines the viewport of the single image. The term "viewport" refers to the area an image encompasses on display 12. For example, application 42 may define the size and location of the single image (e.g., mono view) on display 12. This definition of the size and location of the single image may be considered as the viewport for the single image. To define the viewport, application processor 22, via application 42, may issue a glViewport command whose variables define the size and location of the mono view image on display 12. Application processor 22, via graphics driver wrapper 26, may modify the command that defines the size and location of the single image (e.g., the glViewport command issued by application 32) to commands that define the size and location of the left-eye image and the right-eye image (e.g., glViewport commands that define the viewport for the left-eye image and the viewport for the right-eye image) based on the viewing angle. The glViewport command for the left-eye image may constrain the left-eye image to one portion of the display based on the viewing angle, and the glViewport command for the right-eye image may constrain the right-eye image to another portion of the display based on the viewing angle. It may be possible for these two portions to at least partially overlap.

In some examples, application processor 22, via graphics driver wrapper 26, may modify the glViewport command to increase or decrease the horizontal disparity between the left-eye image and the right-eye image. For example, when the left-eye image is constrained to one portion, and the right-eye image is constrained to another portion, there may be certain, fixed horizontal disparity between all of the similar objects in the left-eye image and objects in the right-eye image. In other words, the amount of horizontal disparity between each of the corresponding vertices in the left-eye image and right-eye image may be the same. As an illustrative example, assume that the image generated by application 42 included a ball and a block. In this example, the horizontal disparity between the vertices of the ball in the left-eye image and the right-eye image may be the same as the horizontal disparity between the vertices of the block in the left-eye image and the right-eye image. Accordingly, the resulting stereoscopic view, the ball and the block may appear at the zero disparity plane, where the zero disparity plane is ahead of or behind display 12. When the ball and block appear at the zero disparity plane that ball and block may not appear pushed in to the zero disparity plane or pushed out of the zero disparity plane.

To adjust the location of the zero disparity plane (e.g., the amount by which the zero disparity place is ahead of or behind display 12), application processor 22, via graphics driver wrapper 26, may modify the instructions of the glViewport command to allow the viewer to define the horizontal disparity between similar objects in the left-eye image and objects in the right-eye image. For example, the viewer may provide a horizontal disparity value that defines the horizontal disparity between similar objects in the left-eye image and right-eye image.

In this way, the viewer may be considered as defining the horizontal disparity between the left-eye image and the right-eye image because the viewer may further define the amount by which all similar objects in the left-eye image and the right-eye image are horizontally displaced. As described above, the amount of horizontal disparity between the left-eye image and the right-eye image defines the amount by which the stereoscopic view appears ahead of or behind display 12. Accordingly, by defining the horizontal disparity between the left-eye image and the right-eye image, the viewer may define the location of the zero disparity plane.

In some examples, instead of the viewer defining the horizontal disparity between the left-eye image and the right-eye image, application processor 22 may estimate the horizontal disparity between the left-eye image and the right-eye image. As one example, application processor 22 or graphics driver wrapper 26 may be preloaded with the horizontal disparity value that graphics driver wrapper 26 uses to increase or decrease the horizontal disparity between the left-eye image and the right-eye image. This horizontal disparity value may be based on an assumption of a common distance from which viewers generally view display 12. For instance, in examples where device 10 is a mobile device, most viewers hold device 10 at approximately the same distance away from their face. Accordingly, most viewers may prefer the zero disparity plane to appear at approximately the same distance ahead of display 12. Application processor 22 or graphics driver wrapper 26 may be preloaded with the horizontal disparity value that creates the zero disparity plane at the commonly preferred distance ahead of display 12.

As another example, camera processor 44 may be configured to determine an estimate of the distance of the viewer from display 12. For instance, camera processor 44 may identify the head of the viewer, and based on a measure of the head size, camera processor 44 may estimate a distance of the viewer relative to display 12. In this example, application processor 22 may utilize this estimate of the distance of the viewer to determine the horizontal disparity value, where the horizontal disparity value defines the amount of horizontal disparity between the left-eye image and the right-eye image.

In the techniques described in this disclosure, the glViewport command may not be an instruction of vertex shader 38. Rather, a viewport transformation unit of fixed-function pipeline 34 may constrain the left-eye image to one portion, and constrain the right-eye image to another portion based on the glViewport command. In these examples, GPU 30 may provide the glViewport command to the viewport transformation unit of fixed-function pipeline 34 to constrain the left-eye image to one portion of display 12 based on the viewing angle, and constrain the right-eye image to another portion of display 12 based on the viewing angle, such that the zero disparity plane is at the desired location relative to display 12.

In the above example of the modification of the glViewport command, application processor 22, via graphics driver wrapper 26, may define the horizontal disparity between the left-eye image and the right-eye image so that the viewer perceives the stereoscopic view at the desired zero disparity plane. In some examples, even better viewing experience may be realized by allowing the viewer to increase or decrease the horizontal disparity between similar objects by different amounts. For instance, in the glViewport command modification, application processor 22, via graphics driver wrapper 26, may modify the glViewport command such that all similar objects in the left-eye image and right-eye are displaced by the same amount. This results in the stereoscopic view appearing ahead or behind display 12 at the zero disparity plane. However, the viewer may also desire to cause some objects to appear ahead of the zero disparity plane, some objects to appear behind the zero disparity plane, and some objects to appear at the zero disparity plane.

In some examples, rather than the viewer or application processor 22 determining the horizontal disparity value that defines the location of the zero disparity plane, the viewer may define the location of the zero disparity plane, or application processor 22 may determine the location of the zero disparity plane. In these examples, application processor 22, via graphics driver wrapper 26, may not necessarily need to modify the glViewport command issued by application 42, other than to cause the glViewport command to execute twice: one for the left-eye image, and another for the right-eye image. Rather, application processor 22, via graphics driver wrapper 26, may further modify the instructions of vertex shader 38 such that vertices of primitives outputted by application 42 are displaced by different amounts in the left-eye image and the right-eye image.

For instance, in the example where graphics driver wrapper 26 modifies the glViewport command, graphics driver wrapper 26 may be considered as defining the horizontal disparity at the image level (e.g., the horizontal disparity between the right-eye image and the left-eye image). For example, graphics driver wrapper 26 may create two glViewport commands: one to constrain the left-eye image to one portion based on the viewing angle, and the other to constrain the right-eye image to another portion based on the viewing angle. For example, application 42 may issue the glViewport command that defines the viewport of the single image. Graphics driver wrapper 26 may modify the glViewport command issued by application 42 to define the viewport of the left-eye image in a first execution instance, and modify the glViewport command issued by application 42 to define the viewport of the right-eye image in a second execution instance.

In the example where application processor 22, via graphics driver wrapper 26, further modifies the instructions of vertex shader 38, graphics driver wrapper 26 may be considered as defining the horizontal disparity at the vertex level (e.g., the horizontal disparity between a vertex in the left-eye image and a vertex in the right-eye image). Accordingly, modifying the instructions of vertex shader 38 to adjust disparity may provide finer level of disparity adjustment as compared to modifying instructions of the glViewport command to adjust disparity. In the example where graphics driver wrapper 26 further modifies the instructions of vertex shader 38, GPU 30 may utilize the glViewport command issued by application 42 to define the viewports for the left-eye image and the right-eye image (e.g., no modification of the glViewport command may be needed). For example, graphics driver wrapper 26 may cause the glViewport command to execute twice: once for each of the left-eye and right-eye images. However, in this example, graphics driver wrapper 26 may not modify the glViewport command issued by application 42, and the additional modifications to the instructions of vertex shader 38 may allow for the vertices to be displaced by different amounts so that some objects appear ahead of the zero disparity plane, some objects appear behind the zero disparity plane, and some objects appear at the zero disparity plane.

For instance, application 42 may define the vertices of primitives in three-dimensions (e.g., x, y, z, w coordinates), where the w coordinate is the homogenous coordinate. In the techniques described in this disclosure, application processor 22, via graphics driver wrapper 26, may utilize a value of the z-coordinate of a vertex to determine the amount by which the vertex is displaced in the left-eye image and the right-eye image. For example, if the value of the z-coordinate is equal to the location of the zero disparity plane, the modified instructions of vertex shader 38 may not displace the vertex in the left-eye image and the right-eye image. If, however, the value of the z-coordinate is not equal to the location of the zero disparity plane, then the modified instructions of vertex shader 38 may displace the location of the vertex in the left-eye image and the right-eye image. The amount by which the modified instructions of vertex shader 38 displace the location of the vertex may be based on the value of the z-coordinate.

In examples where graphics driver wrapper 26 modifies the glViewport command to adjust the disparity at the image level, graphics driver wrapper 26 may not further modify the instructions of vertex shader 38 to adjust the disparity at a vertex level. In examples where graphics driver wrapper 26 further modifies the instructions of vertex shader 38 to adjust the disparity at a vertex level, graphics driver wrapper 26 may not modify the glViewport command to adjust the disparity at the image level. However, aspects of this disclosure are not so limited, and it may be possible for graphics driver wrapper 26 to modify both the glViewport command to adjust the disparity at the image level, and further modify the instructions of vertex shader 38 to adjust the disparity between vertices at the vertex level.

Also, when graphics driver wrapper 26 modifies only the glViewport command to adjust the location of the zero disparity plane, GPU 30 may be able to render the stereoscopic view faster than when graphics driver wrapper 26 further modifies the instructions of vertex shader 38 to adjust the locations of where the objects appear relative to the zero disparity plane (e.g., ahead of, at, or behind the zero disparity plane). This may be because vertex shader 38 takes longer to execute on shader processor 32 as compared to the viewport adjustment unit of fixed-function pipeline 34 adjusting the viewports of the left-eye image and the right-eye image. However, when graphics driver wrapper 26 further modifies the instructions of vertex shader 38 to adjust the locations of where the objects appear relative to the zero disparity plane, the rendered stereoscopic view may provide better viewer experience compared to when graphics driver wrapper 26 modifies the glViewport command. This may be because the further modification of the instructions to vertex shader 38 allows for some objects to appear ahead of, at, or behind the zero disparity plane, whereas with the modification to the glViewport command all objects appear at the zero disparity plane, which may be ahead of or behind display 12.

It may be a matter of design choice whether to modify the glViewport command or further modify the instructions of vertex shader 38. For instance, if rendering time is the important factor, then application processor 22, via graphics driver wrapper 26, may modify the glViewport command. If more ideal viewing experience is the important factor, then application processor 22, via graphics driver wrapper 26, may further modify the instructions of vertex shader 38.

Accordingly, graphics driver wrapper 26 may modify the instructions of vertex shader 38 such that when the modified instructions of vertex shader 38 execute of shader processor 32, GPU 30 may displace the vertices of the primitives in one direction based on the viewing angle, and in another direction based on the viewing angle. In some examples, graphics driver wrapper 26 may further modify the instructions of vertex shader 38 such that when the further modified instructions of vertex shader 38 execute on shader processor 32, GPU 30 may displace the vertices of the primitives in one direction based on the viewing angle and based on a location of the zero disparity plane. In some examples, graphics driver wrapper 26 may modify the instructions of a glViewport command issued by application 42 such that a viewport transformation unit of fixed-function pipeline 34 increases or decreases the horizontal disparity between the left-eye image and right-eye image to adjust the location of the zero disparity plane.

The following describes an example manner in which application processor 22, GPU 30, and system memory 36 may function together to cause GPU 30 to render stereoscopic view from application 42 that generates a mono-view. For instance, application processor 22 may determine the viewing angle based on one or more outputs from one or more sensors 42 and camera processor 44. Application processor 22 may determine the viewing angle periodically such as once per rendering of both the left-eye image and right-eye image by GPU 30, as one example (i.e., once per generation of the stereoscopic view). Graphics driver wrapper 26 may utilize this determined viewing angle to modify the instructions issued by application 42 and to modify the instructions of vertex shader 38.

For example, to cause GPU 30 to render an image, application processor 22 may execute a glShaderSource command of application 42. The glShaderSource command instructs graphics driver 24 to retrieve the source code of vertex shader 38 from system memory 36. In examples of this disclosure, in response to the glShaderSource command issued by application 42, graphics driver wrapper 26 may intercept the source code of vertex shader 38 before it reaches graphics driver 24. Application processor 22, via graphics driver wrapper 26, may modify the source code of vertex shader 38 to include instructions that cause modified vertex shader 38, when executed, to generate graphics content for stereoscopic view based on the viewing angle determined by application processor 22. For example, graphics driver wrapper 26 may cause the modified vertex shader 38 to execute twice. In the first execution, the modified vertex shader 38 may generate graphics content for the left-eye image based on the viewing angle, and in the second execution, the modified shader 38 may generate graphics content for the right-eye image based on the viewing angle, or vice-versa. Additionally, in some examples, graphics driver wrapper 26 may further modify the instructions of vertex shader 38 to determine the location of vertices based on the location of the zero disparity plane.

Graphics driver wrapper 26, as executed by application processor 22, may function as a source code editor. As one example, graphics driver wrapper 26 may monitor the instructions issued by application 42. When graphics driver wrapper 26 recognizes that application 42 issued the glShaderSource command, graphics driver wrapper 26 may capture and modify the instructions of vertex shader 38 (e.g., the source code of vertex shader 38). For example, graphics driver wrapper 26 may include instructions into the source code of vertex shader 38 that modify the value of the clipping coordinates generated for the single image (e.g., mono view) to generate the clipping coordinates for the left-eye image and the right-eye image (e.g., stereoscopic view) based on the viewing angle.

For example, as indicated above, vertex shader 38 may include a gl_Position.x variable that stores the value for the $x_{clip}$ coordinate, and a gl_Position.y variable that stores the value of $y_{clip}$. As discussed in greater detail below, graphics driver wrapper 26 may include a first instruction into vertex shader 38 that updates the value of gl_Position.x (e.g., the $x_{clip}$ coordinate) based on the viewing angle, and include a second instruction into vertex shader 38 that updates the value of gl_Position.y (e.g., the $y_{clip}$ coordinate) based on the viewing angle.

To generate the left-eye image, the first instruction added into vertex shader 38 by application processor 22, via graphics driver wrapper 26, causes vertex shader 38 to add a first value to the $x_{clip}$ value. The first value may be based on the distance between the eyes of the viewer and the viewing angle. The second instruction added into vertex shader 38 by application processor 22, via graphics driver wrapper 26, causes vertex shader 38 to add a second value to the $y_{clip}$ value. The second value may be based on the distance between the eyes of the viewer, the viewing angle, and the height and width of display 12.

To generate the right-eye image, the instruction added into vertex shader 38 by graphics driver wrapper 26 causes vertex shader 38 to subtract the first value to the $x_{clip}$ value.

The first value for the right-eye image may be the same value as the first value for the left-eye image. The second instruction added into vertex shader 38 by graphics driver wrapper 26 causes vertex shader 38 to subtract the second value to the $y_{clip}$ value. The second value for the right-eye image may be the same value as the second value for the left-eye image.

For example, application processor 22, via graphics driver wrapper 26, may modify the source code of vertex shader 38 to add an instruction that changes the value stored in the gl_Position.x variable (e.g., the $x_{clip}$ coordinate) to the current value of the gl_Position.x variable plus $(z_{near}*w_{world}/(R-L)/2)*X$, where $z_{near}$, R, and L are all variables from the PRJ matrix (equation 4), and $w_{world}$ is a variable from the $V_{world}$ matrix (equation 2) (e.g., the vertex coordinates defined by application 42). Application processor 22, via graphics driver wrapper 26, may modify the source code of vertex shader 38 to add another instruction that changes the value stored in the gl_Position.y variable (e.g., the $y_{clip}$ coordinate) to the current value of the gl_Position.y variable plus $(z_{near}*w_{world}/(T-B)/2)*Y$, where $z_{near}$, T, and B are all variables from the PRJ matrix (equation 4), and $w_{world}$ is a variable from the $V_{world}$ matrix (equation 2) (e.g., the vertex coordinates as defined by application 42).

The value of X may be $+D*\cos(\alpha)$ or $-D*\cos(\alpha)$, where D is an approximation of half the distance between the right eye and the left eye of the viewer, and may be user definable or a preprogrammed value, and alpha, $\alpha$, is the viewing angle. Application processor 22 may determine the viewing angle based on the outputs of one or more sensors 42 and camera processor 44, as one example. The value of Y may be $+D*\sin(\alpha)$ or $-D*\sin(\alpha)$.

For example, assume that the distance between the left eye and the right eye is $2*D$. In this example, the coordinates of the left eye of the viewer may be $(-D_x, -D_y, -D_z)$, and the coordinates of the right eye of the viewer may be $(D_x, D_y, D_z)$. The $D_z$ coordinate may be considered as zero because the coordinates of the left eye and the right eye may start from the front of the face of the viewer, and the middle of the eyes (i.e., the (0, 0, 0) location is located at the front of the face of the viewer and the point that is in between the left eye and right eye of the viewer). If the viewing angle is alpha, then the coordinates for the left eye of the viewer may be $(-D_x*\cos(\alpha), -D_y*\sin(\alpha), 0)$, and the coordinates for the right eye of the view may be $(D_x*\cos(\alpha), D_y*\sin(\alpha), 0)$. In this example, if the viewing angle is zero, then the coordinates of the left-eye and right-eye become $(-D_x, 0, 0)$, and $(D_x, 0, 0)$. However, when the viewing angle is not zero, the viewing angle may be define the location of the left eye and right eye of the viewer relative to the (0, 0, 0) location. The coordinates for the left eye and right eye may be considered as:

$$Eye_{left} = \begin{bmatrix} -D_x \\ -D_y \\ -D_z \end{bmatrix} = \begin{bmatrix} -D*\cos(\alpha) \\ -D*\sin(\alpha) \\ 0 \end{bmatrix} \quad \text{(equation 6)}$$

$$Eye_{right} = \begin{bmatrix} D_x \\ D_y \\ D_z \end{bmatrix} = \begin{bmatrix} D*\cos(\alpha) \\ D*\sin(\alpha) \\ 0 \end{bmatrix} \quad \text{(equation 7)}$$

Application processor 22, via graphics driver wrapper 26, may add the following instruction to the set of instructions of vertex shader 38: gl_Position.x+=$(z_{near}*w_{world}/(R-L)/2)*X$. This may be equivalent to gl_Position.x=gl_Position.x+$(z_{near}*w_{world}/(R-L)/2)*X$. For example, the gl_Position.x+=commands adds the value defined by the gl_Position.x+=instruction to the value stored by the gl_Position command (e.g., adds the value to $x_{clip}$). In some situations, the gl_Position.x+=instruction may simplify to gl_Position.x+=X. The reasons why the gl_Position.x+variable may equal $(z_{near}*w_{world}/(R-L)/2)*X$ or just X are described in further detail below.

Application processor 22, via graphics driver wrapper 26, may also add the following instruction to the set of instructions of vertex shader 38: gl_Position.y+=$(z_{near}*w_{world}/(T-B)/2)*Y$. This may be equivalent to gl_Position.y=gl_Position.y+$(z_{near}*w_{world}/(T-B)/2)*Y$. For example, the gl_Position.y+=commands adds the value defined by the gl_Position.y+=instruction to the value stored by the gl_Position command (e.g., adds the value to $y_{clip}$). In some situations, the gl_Position.y+=instruction may simplify to gl_Position.y+=Y*width of display 12 divided by height of display 12. The reasons why the gl_Position.y+variable may equal $(z_{near}*w_{world}/(T-B)/2)*Y$ or just Y*width of display 12 divided height of display 12 are described in further detail below.

In accordance with the techniques of this disclosure, to generate the left-eye image, application processor 22, via graphics driver wrapper 26, may define the value of the variable X to be $D*\cos(\alpha)$. This is because that moving of viewing location left is equivalent to moving of object observed right. When X equals $+D*\cos(\alpha)$, the gl_Position.x+=command causes the addition of a constant (e.g. $(z_{near}*w_{world}/(R-L)/2)*D*\cos(\alpha)$ or just $D*\cos(\alpha)$) to the $x_{clip}$ coordinate of each of the vertices generated by application 42 which causes the vertices to move to the left by a value of $D*\cos(\alpha)$. Also, to generate the left-eye image, application processor 22, via graphics driver 26, may define the value of the variable Y to be $D*\sin(\alpha)$. This is because that moving of viewing location down is equivalent to moving of object observed up. When Y equals $+D*\sin(\alpha)$, the gl_Position.y+=command causes the addition of a constant (e.g. $(z_{near}*w_{world}/(T-B)/2)*D*\sin(\alpha)$ or just $D*\sin(\alpha)*$width of display 12 divided height of display 12) to the $y_{clip}$ coordinate of each of the vertices generated by application 42 which causes the vertices to move to the left by a value of $D*\sin(\alpha)*$width/height, where the width is the width of display 12 and height is the height of display 12.

To generate the right-eye image, application processor 22, via graphics driver wrapper 26, may define the value of the variable X to be $-D*\cos(\alpha)$. This is because that moving of viewing location right is equivalent to moving of object observed left. When X equals $-D*\cos(\alpha)$, the gl_Position.x+=command causes the subtraction of a constant (e.g., $(z_{near}*w_{world}/(R-L)/2)*-D*\cos(\alpha)$ or just $-D*\cos(\alpha)$) from the $x_{clip}$ coordinate of each of the vertices generated by application 42 which causes the vertices to move to the right by a value of $-D*\cos(\alpha)$. Also, to generate the right-eye image, application processor 22, via graphics driver wrapper 26, may define the value of the variable Y to be $-D*\sin(\alpha)$. This is because of that moving of viewing location up is equivalent to moving of object observed down. When Y equals $-D*\sin(\alpha)$, the gl_Position.y+=command causes the subtraction of a constant (e.g., $(z_{near}*w_{world}/(T-B)/2)*-D*\sin(\alpha)*$width/height or just $-D*\cos(\alpha)*$width/height) from the $y_{clip}$ coordinate of each of the vertices generated by application 42 which causes the vertices to move to the right by a value of $-D*\sin(\alpha)*$width/height.

After modifying the source code of vertex shader 38, application processor 22 may store the modified source code of vertex shader 38 in system memory. In some examples, application processor 22 may store the modified source of vertex shader 38 in the same location where the unmodified source code of vertex shader 38 is stored in system memory 36. In another example, application processor 22 may store the modified source of vertex shader 38 in a location in system memory 36 that is different from the location where the unmodified source code of vertex shader 38 is stored.

Subsequent to issuing the glShaderSource command, application 42 issues a glCompileShader command. The glCompileShader command causes compiler 28, executing on application processor 22, to compile the modified source code of vertex shader 38. For example, the glCompileShader command may cause compiler 28 to retrieve the source code for the modified vertex shader 38 from system memory 36, and compile the modified vertex shader 38. After compiling, compiler 28 stores the resulting object code in system memory 36. For example, as illustrated, system memory 36 includes modified vertex shader 40. Modified vertex shader 40 is the object code resulting from compiler 28 compiling the modified source code of vertex shader 38.

Moreover, as described above, graphics driver wrapper 26 may include instructions in the source code of vertex shader 28 that cause vertex shader 28 to add a constant to the gl_Position.x variable and the gl_Position.y variable to generate the left-eye image and subtract the constant from the gl_Position.x and the gl_Position.y variable to generate the right-eye image. The object code of modified vertex shader 40 includes instructions that cause modified vertex shader 40 to add the constant to the gl_Position.x variable and the gl_Position.y variable to generate the left-eye image and subtract the constant from the gl_Position.x variable and the gl_Position.y variable to generate the right-eye image. As described in more detail, modified vertex shader 40 receives the value of the constant from application processor 22, via graphics driver wrapper 26, in response to a draw command from application 42.

In some examples, as described above, application processor 22, via graphics driver wrapper 26, may further modify the instruction of vertex shader 38 to further adjust the location of the vertices in the left-eye image and the right-eye image so that some objects appear ahead of, at, or behind the zero disparity plane. For instance, as described above, graphics driver wrapper 26 may modify the instructions of vertex shader 38 to include the following instructions: gl_Position.x+=X and gl_Position.y+=Y*width/height, where X equals +D*cos($\alpha$) and Y equals +D*sin($\alpha$) for the left-eye image, and X equals −D*cos($\alpha$) and Y equals −D*sin($\alpha$) for the right-eye image.

To further allow adjustment at the vertex level, graphics driver wrapper 26 may modify the instructions of vertex shader 38 to include the following instructions: gl_Position.x+=X*(1−(gl_Position.w/ZDP$_{loc}$)) and gl_Position.y+=Y*width/height*(1−(gl_Position.w/ZDP$_{loc}$)). ZDP$_{loc}$ may be the user defined or preconfigured value defining the location of the zero disparity plane relative to display 12. In some other examples, processor 22 may determine an estimation of the location of the zero disparity plane based on an estimation of the location of the viewer as determined by camera processor 44. The gl_Position.w variable stores the w$_{clip}$ coordinate.

For example, similar to the gl_Position.x and gl_Position.y variables, vertex shader 38 may store the w$_{clip}$ coordinates in the gl_Position.w variable. In examples descried in this disclosure, the w$_{clip}$ coordinate may equal the negative of the z-coordinate of a primitive as defined by application 42. As described above, application 42 may define primitives as (x, y, z, w). These coordinates may be considered as being defined in the world space (i.e., the v$_{world}$ coordinates of a vertex are (x$_{world}$, y$_{world}$, z$_{world}$, w$_{world}$)).

In the techniques described in this disclosure gl_Position.w may equal −z$_{world}$. The reason why gl_Position.w equals −z$_{world}$ is due to the PRJ matrix defined in equations 3 and 4 above. As shown in the PRJ matrix, the value of the third column, fourth row is −1. As defined in equation 1 above, Vclip equals PRJ*MVT*Vworld. Accordingly, when the PRJ matrix is multiplied by the Vworld matrix and the MVT matrix, the z$_{world}$ coordinate of Vworld is multiplied by the −1 of the third column, fourth row of the PRJ matrix. The w$_{clip}$ coordinate equals the result of the multiplication of z$_{world}$ by −1 (i.e., w$_{clip}$ equals −z$_{world}$), and the gl_Position.w variable stores the value of w$_{clip}$ (i.e., gl_Position.w equals −z$_{world}$).

It may be possible to replace the gl_Position.x+=X*(1−(gl_Position.w/ZDP$_{loc}$)) and gl_Position.y+=Y*width/height*(1−(gl_Position.w/ZDP$_{loc}$)) commands with gl_Position.x+=X*(1+(z$_{world}$/ZDP$_{loc}$)) and gl_Position.y+=Y*width/height*(1+(z$_{world}$/ZDP$_{loc}$)). However, graphic driver wrapper 26 may not have access to all of the z$_{world}$ values outputted by application 42. In the techniques described in this disclosure, if vertex shader 38 is designed in accordance with the OpenGL 2.0 ES API, as one example, then vertex shader 38 may be designed to include the gl_Position.w variable that is equal to w$_{clip}$, which in this case is also equal to −z$_{world}$. Accordingly, although graphics driver wrapper 26 may not have access to the z$_{world}$ coordinate, graphics driver wrapper 26 may utilize the gl_Position.w variable to determine the value of z$_{world}$.

The z$_{world}$ coordinate may provide a measure of relative depth of the vertices within the single image outputted by application 42. For example, the single image outputted by application 42 may be constrained to the 2D area of display 12; however, the objects within the single image may appear head of or behind other objects based on the z$_{world}$ coordinate of the vertices. In examples where graphics driver wrapper 26 modifies the instructions of vertex shader 38 to include the gl_Position.x+=X*(1−(gl_Position.w/ZDP$_{loc}$)) and gl_Position.y+=Y*width/height*(1−(gl_Position.w/ZDP$_{loc}$)) commands, graphics driver wrapper 26 may account for the relative depths of the vertices to determine how much to displace vertices in one direction for the left-eye image and in the other direction for the right-eye image.

For instance, when −z$_{world}$ a vertex in the single image (i.e., as defined by the gl_Position.w variable) equals ZDP$_{loc}$, gl_Position.x+=0, and gl_Position.y+=0. In this case, modified vertex shader 38 may not displace the vertex in either the left-eye image or right-eye image because gl_Position.x and gl_Position.y for the left-eye image equals gl_Position.x and gl_Postion.y for the right-eye image, respectively. However, when −z$_{world}$ of a vertex in the single image does not equal ZDP$_{loc}$, then modified vertex shader 38 may displace the vertex in one direction for the left-eye image based on the viewing angle, and in another direction for the right-eye image based on the viewing angle. Moreover, because the −z$_{world}$ coordinate for vertices in the single image generated by application 42 may be different, modified vertex shader 38 may displace different vertices in the single image by different amounts to create the left-eye image and the right-eye image.

In other words, further multiplication of the X and Y*width/height variables with (1−(gl_Position.w/ZDP$_{loc}$)) results in a vertex level determination of how much a vertex is to be displaced in the left-eye image and the right-eye image. Also, because the vertices in the single image may be displaced by different amounts based on the value of $z_{world}$, in the resulting stereoscopic view, some objects may appear ahead of the zero disparity plane, some objects may appear at the zero disparity plane, and some objects may appear behind the zero disparity plane.

In some examples, instead of or in addition to further modifying the instructions of vertex shader 38 to multiple the X and Y*width/height variables with (1−(gl_Position.w/ZDP$_{loc}$)), graphics driver wrapper 26 may modify the glViewport command to adjust the location of the zero disparity plane. For example, application 42, upon execution by processor 22, may also issue a command that defines the viewport of the single image (e.g., a command that defines the size and location of the single image on display 12). This command may be the glViewport command. The glViewport command defines the starting coordinates for the image (e.g., x and y coordinates) and the width and length of the image. The starting coordinates and the width and length values of the glViewport command define the size and location of the image.

In some examples, graphics driver wrapper 26 may capture the glViewport command issued by application 42. In these examples, graphics driver wrapper 26 may block graphics driver 24 from transmitting the glViewport command issued by application 42 to GPU 30. Instead, graphics driver wrapper 26 may store the starting coordinates and the width and length values of the glViewport command, as issued by application 42, in system memory 36.

In an alternate example, graphics driver wrapper 26 may allow graphics driver 24 to transmit the glViewport command issued by application 42 to GPU 30. In this example, similar to above, graphics driver wrapper 26 may store the starting coordinates and the width and length values of the glViewport command, as issued by application 42. In this alternate example, prior to GPU 30 applying the glViewport command issued by application 42, graphics driver wrapper 26 may modify the glViewport command issued by application 42, and transmit the modified glViewport command to GPU 30. In this manner, although GPU 30 received the glViewport command issued by application 42, GPU 30 may execute the modified glViewport command, which is modified by graphics driver wrapper 26.

In either example, graphics driver wrapper 26 may then wait until application 42 issues a command to GPU 30 instructing GPU 30 to draw one or more primitives. This draw command may be a glDraw command. There are various examples of glDraw commands such as glDrawArrays and glDrawElements. Each of these various examples of draw commands is commonly referred to as a glDraw command.

When application 42 issues the glDraw command, graphics driver wrapper 26 captures the glDraw command, and blocks graphics driver 24 from transmitting the glDraw command to GPU 30. Graphics driver wrapper 26 then generates instructions that cause GPU 30 to generate the graphics content for the left-eye image and the right-eye image. As one example, graphic driver wrapper 36 generates instructions that cause GPU 30 to execute the object code of modified vertex shader 40 twice, issues two glViewport commands to define the viewport for the left-eye image and the right-eye image, and issues two glDraw commands.

In examples where graphics driver wrapper 26 modifies the instructions of vertex shader 38 to multiply the X and Y*width/height variables with (1−(gl_Position.w/ZDP$_{loc}$)), graphics driver wrapper 26 may not modify the glViewport commands, but may still issue to glViewport commands, one for each of the left-eye image and the right-eye image. In examples where graphics driver wrapper 26 does not modify the instruction of vertex shader 38 to multiply the X and Y*width/height variables with (1−(gl_Position.w/ZDP$_{loc}$)), graphics driver wrapper 26 may modify the glViewport command, and issue two glViewport commands, where the two glViewport commands are different the glViewport command issued by application 42.

As an overview of the techniques for either the vertex level adjustment of the disparity between vertices or the image level adjustment of the disparity between left-eye image and right-eye image, after graphics driver wrapper 26 blocks graphics driver 24 from the transmitting the glDraw command issued by application 42, graphics driver wrapper 26 issues a command to GPU 30 that causes shader processor 32 to make the modified vertex shader 40 ready to generate clipping coordinates for a first image of the stereoscopic view (e.g., the left-eye image). Then, graphics driver wrapper 26 may issue a first glViewport command to a viewport transformation unit of the fixed-function pipeline 34 which defines the size and location of the first image on the display. Graphics driver wrapper 26 may then issue a first glDraw command to GPU 30 that causes GPU 30 to render the first image constrained to a first portion of the display as defined by the first glViewport command.

Graphics driver wrapper 26 then issues a command to GPU 30 that causes shader processor 22 to make the modified vertex shader 40 ready to generate clipping coordinates for a second image of the stereoscopic view (e.g., the right-eye image). Then, graphics driver wrapper 26 may issue a second glViewport command to a viewport to the viewport transformation unit of the fixed-function pipeline 34 which defines the size and location of the second image on the display. Graphics driver wrapper 26 may then issue a second glDraw command to GPU 30 that causes GPU 30 to render the second image constrained to a second portion of the display as defined by the second glViewport command.

The techniques of this disclosure, described as an overview above, are described in more detail in the following examples. For ease of understanding only, in the following examples, the techniques are described with GPU 30 generating the graphics content for the left-eye image first, followed by the graphics content for the right-eye image; however, the opposite is also possible.

For example, after graphics driver wrapper 26 intercepts the glViewport command and then blocks the glDraw command issued by application 42, graphics driver wrapper 26 generates an instruction that instructs GPU 30 to generate clipping coordinates for the left-eye image. Again, it should be noted that in some examples graphics driver wrapper 26 may block the transmission of the glViewport command issued by application 42 to GPU 30. In other examples, graphics driver wrapper 26 may allow the glViewport command issued by application 42 to be transmitted to GPU 30.

As one example, application processor 22, via graphics driver wrapper 26, generates an instruction that causes GPU 30 to execute the object code of modified vertex shader 40. In response, shader processor 32 of GPU 30 executes the object code of modified vertex shader 40. In addition, application processor 22, via graphics driver wrapper 26, transmits the constant value that modified vertex shader 30 is to add to the gl_Position.x variable to generate the clipping coordinates for the left-eye image. The output of shader processor 42, due to the execution of the object code of modified vertex shader 40, is the clipping coordinates for the vertices of the left-eye image.

For instance, as discussed above, graphics driver wrapper 26 may include the following instructions into the source code of vertex shader 38: gl_Position.x+=($z_{near}$*$w_{world}$/(R−L)/2)*X, or just gl_Position.x+=X and gl_Position.y+=($z_{near}$*$w_{world}$/(T−B)/2)*Y, or just gl_Position.y+=Y*width/height, for reasons that will be described. As described above, for vertex level adjustment of the disparity between vertices, graphics driver wrapper 26 may further modify the gl_Position.x and gl_Postion.y commands in the source code of vertex shader 38. For instance, in these examples, graphics driver wrapper 26 may include the following instructions into source code of vertex shader 38: gl_Position.x+=($z_{near}$*$w_{world}$/(R−L)/2)*X*(1−(gl_Position.w/ZDP$_{loc}$)), or just gl_Position.x+=X*(1−(gl_Position.w/ZDP$_{loc}$)) and gl_Position.y+=($z_{near}$*$w_{world}$/(T−B)/2)*Y*(1−(gl_Position.w/ZDP$_{loc}$)), or just gl_Position.y+=Y*width/height*(1−(gl_Position.w/ZDP$_{loc}$)), for reasons that will be described The $z_{near}$, $w_{world}$, R, L, T, and B variables may possibly be known to shader processor 32, as described above with respect to equations (2) and (4). However aspects of this disclosure do not require shader processor 32 to know the values of the $z_{near}$, $w_{world}$, R, L, T, and B variables. For example, the $z_{near}$, $w_{world}$, R, L, T, and B variables may each be constants, and therefore the result of ($z_{near}$*$w_{world}$/(R−L)/2) and ($z_{near}$*$w_{world}$/(T−B)/2) would be a constant value. In this case, the value of ($z_{near}$*$w_{world}$/(R−L)/2) and ($z_{near}$*$w_{world}$/(T−B)/2) could be estimated or user provided, and multiplied into the value of X or Y, as appropriate. As described in more detail, in some examples, ($z_{near}$*$w_{world}$/(R−L)/2) may simplify to 1 and ($z_{near}$*$w_{world}$/(T−B)/2) may simply to width/height of display 12.

In some examples, shader processor 32 may not know the value of X and Y. For the left-eye image, graphics driver wrapper 26 may transmit the value of X and Y to shader processor 32 in addition to the instruction instructing shader processor 32 to execute the object code of modified vertex shader 40. In some examples, the value of X, for the left-eye image, may be +D*cos($\alpha$) and the value of Y, for the left-eye image, may be +D*sin($\alpha$), where D equals approximately half the distance between the eyes of the viewer, and may be user defined or preprogrammed, and alpha, $\alpha$, equals the viewing angle as determined by processor 22. Because the value of variable X is +D*cos($\alpha$), the gl_Position.x+=command causes shader processor 32 to add the value of D*cos($\alpha$) to the value stored in the gl_Position.x variable (e.g., add D*cos($\alpha$) to the value of $x_{clip}$). Also, because the value of Y is +D*sin($\alpha$), the gl_Position.y+=command causes shader processor 32 to add the value of D*sin($\alpha$)*width/height to the value stored in the gl_Position.y variable (e.g., add D*sin($\alpha$)*width/height).

Again, for vertex level adjustment of the vertices, the added gl_Position.x+=command causes shader processor 32 to add the value of D*cos($\alpha$)*(1−(gl_Position.w)/(ZDP$_{loc}$) to the value stored in the gl_Position.x variable, and the added gl_Position.y+=command causes shader processor 32 to add the value of D*sin($\alpha$)*(1−(gl_Position.w)/(ZDP$_{10}$) to the value stored in the gl_Position.y variable. However, such vertex level adjustment of the vertices is not necessary in every example.

Graphics driver wrapper 26 also defines the viewport for the left-eye image. For example, prior to when application 42 issued the glDraw command, application 42 issued the glViewport command that graphics driver wrapper 26 intercepted. Graphics driver wrapper 26 also stored the starting coordinates and the width and length values in system memory 36. In examples where graphics driver wrapper 26 modified the instructions of vertex shader 38 for vertex level adjustment of the disparity between vertices, graphics driver wrapper 26 may not modify the instructions of the glViewport command, and may instead issue two glViewport commands that are the same as the glViewport command issued by application 42. In examples where graphics driver wrapper 26 does not modify the instructions of vertex shader 38 for vertex level adjustment of the disparity between vertices, graphics driver 26 may modify the instructions of the glViewport command as described below to determine the location of the zero disparity plane.

To define the viewport for the left-eye image for image level adjustment of the zero disparity plane, graphics driver wrapper 26 may modify the intercepted glViewport command issued by application 42. For example, the glViewport command includes four variables, where the first two variables define the starting coordinate for the image on the display, and the last two variables define the width and length of the image. The width and length variables are not necessarily coordinate values. Rather, the width and length variables define the amount by which the image extends from the starting coordinates. For instance, application 42 may issue a glViewport command that states: glViewport (0, 0, width, length). In this example, the (0, 0) refer to the bottom-left of the display. The variable "width" refers to the width of the display, and the variable "length" refers to the length of the display. Accordingly, in this example, application 42 defines the viewport of the image to encompass the entirety of the display, which would be consistent with a mono view image. However, application 42 may assign different variables for the glViewport command, other than those illustrated.

In accordance with this disclosure, graphics driver wrapper 26 may intercept the glViewport command (e.g., glViewport (0, 0, width, length) of the previous example), and modify the variables for this viewport command. For example, graphics driver wrapper 26 may modify the variables of the glViewport command to constrain the left-eye image to a desired portion of the display. For ease of description, the techniques describe constraining the left-eye image to the left half of the display, and right-eye image to the right half of the display; however, aspects are not so limited.

For the left-eye image, graphics driver wrapper 26 may modify glViewport command issued by application 42 to glViewport (0, 0, width/2, length). In this example, the width/2 would be half of the width of the display. For example, the modified glViewport command indicates that the left-eye image with start from the left end of the display (e.g., starting from 0 point on the x-axis) and extend rightwards a distance of "width/2," which would constrain the left-eye image to the left half of the display. Also, the modified glViewport command indicates that the left-eye image will start from the bottom of the display (e.g., starting from the 0 point on the y-axis) and extend upwards a distance of "length," which would constrain the image to the top and bottom of the display.

In either example (e.g., where the glViewport command is modified or where the glViewport command is not modified), graphics driver wrapper 26 may then issue a first glDraw command to GPU 30. In response to the glDraw command, GPU 30 may process the clipping coordinates for the left-eye image generated by the execution of the object code of the modified vertex shader 40 through fixed-function pipeline 34 and fragment shaders. In the example with glViewport command modification, the first glViewport command may constrain the left-eye image to the left half of the display. In the example without glViewport command modification, the first glViewport command may not constrain the left-eye image to the left half of the display. The glDraw command may then cause GPU 30 to render the left-eye image to a frame buffer for temporary storage. For example, the frame buffer may store the left-eye image until the right-eye image is generated. Then, GPU 30 may output the entirety of the frame buffer to a display processor (not shown). The display processor may cause the display to display the left-eye image and the right-eye image to generate the stereoscopic view.

Graphics driver wrapper 26 may repeat the same steps for generating the left-eye image, but for generating the right-eye image. For example, graphics driver wrapper 26 issues another instruction to cause shader processor 32 to execute the object code of modified vertex shader 40. In addition, graphics driver wrapper 26 transmits the constant value that modified vertex shader 40 is to subtract from the gl_Position.x variable to generate the clipping coordinates for the right-eye image and to subtract from the gl_Position.y variable to generate the clipping coordinates for the left-eye image. The output of shader processor 32, due to the execution of the object code of modified vertex shader 40, is the clipping coordinates for the vertices of the right-eye image.

As described above, graphics driver wrapper 26 may add the instruction gl_Position.x+=$(z_{near}*w_{world}/(R-L)/2)*X$, or just gl_Position.x+=X to the source code of vertex shader 38, and add the instruction gl_Position.y+=$(z_{near}*w_{world}/(T-B)/2)*Y$, or just gl_Position.y+=Y*width/height. For the left-eye image, the value of variable X may be +D*cos($\alpha$) and the value of variable Y may be +D*sin($\alpha$). In examples of this disclosure, for the right-eye image, the value of variable X may be −D*cos($\alpha$) and the value of variable Y may be −D*sin($\alpha$). Because the value of variable X is −D*cos($\alpha$), the gl_Position.x+=command causes shader processor 32 to subtract the value of D*cos($\alpha$) from the value stored in the gl_Position.x variable. Also, because the value of variable Y is −D*sin($\alpha$), the gl_Position.y+=command causes shader processor 32 to subtract the value of D*sin($\alpha$)*width/height from the value stored in the gl_Position.y variable.

In some examples (e.g., for image level adjustment of the disparity between the left-eye image and the right-eye image), graphics driver wrapper 26 also defines the viewport for the right-eye image. As discussed above, for the left-eye image, graphics driver wrapper 26 defines the viewport to be glViewport (0, 0, width/2, length) to constrain the left-eye image to the left half of the display. For the right-eye image, graphics driver wrapper 26 may define the viewport to be glViewport (width/2, 0, width/2, length). In this example, the (width/2, 0) coordinate indicates that the right-eye image will start from the middle of the display and extend rightwards. Also, the (width/2, length) variables in the glViewport command indicate that the right-eye image will extend half the width of the display and the full length of the display.

Therefore, in this example, the modified glViewport command (e.g., glViewport (width/2, 0, width/2, length)) would constrain the right-eye image to the right half of the display. For example, the modified glViewport command indicates that the right-eye image will start from the middle of the display (e.g., starting from the width/2 point on the x-axis) and extend rightward a distance of "width/2," which would constrain the right-eye image to the right half of the display. Also, the modified glViewport command indicates that the right-eye image will start from the bottom of the display (e.g., starting from the 0 point on the y-axis) and extend upward a distance of "length," which would constrain the image to the top and bottom of the display.

Graphics driver wrapper 26 may then issue a second glDraw command to GPU 30. In response to the glDraw command, GPU 30 may process the clipping coordinates for the right-eye image generated by the execution of the object code of the modified vertex shader 40 through fixed-function pipeline 34 and fragment shaders. The glDraw command may then cause GPU 30 to render the right-eye image to the frame buffer for temporary storage. In this case, GPU 30 may have already stored the left-eye image to the frame buffer, and GPU 30 may instruct the display processor to retrieve and display the stored left-eye image and right-eye image from the frame buffer to generate the stereoscopic view.

As described above, graphics driver wrapper 26 may add the instruction gl_Position.x+=command and the gl_Position.y+=command to the source code of vertex shader 38. It is the gl_Position.x+=command and the gl_Position.y+=command that is added to the source code of vertex shader 38 that causes the slight displacement between the left-eye image and the right-eye image, based on the viewing angle, to cause the popping out or pushing effect of the stereoscopic view.

In the above examples of the modification to the glViewport command, the modifications to glViewport command constrained the left-eye image to the left half of display 12, and constrained the right-eye image to the right half of display 12. However, constraining the left-eye image to the left half of display 12 and constraining the right-eye image to the right half of display 12 may not account for the viewing angle, $\alpha$. Also, constraining the left-eye image to the left half of display 12 and constraining the right-eye image to the right half of display 12 may not allow the viewer to set the desired location of the ZDP.

The following describes the manner in which graphic driver wrapper 26 may modify the glViewport command to account for viewing angle, and to allow the setting of the zero disparity plane at the desired location. For example, as above, assume that the viewport defined by application 42 is glViewport (0, 0, width, height), where the location of the left-bottom of display 12 is (0, 0), and the location of the top-right of display 12 is (width, height).

In this case, for the left-eye image, graphics driver wrapper 26 may modify the glViewport command to be glViewport (−VPshift*cos($\alpha$), −VPshift*sin($\alpha$), width−VPshift*cos($\alpha$), height−Vpshift*sin($\alpha$)), where (−VPshift*cos($\alpha$), −VPshift*sin($\alpha$)) is the left-bottom of the left-eye image and (width−VPshift*cos($\alpha$), height−Vpshift*sin($\alpha$)) is the right-top of the left-eye image. For the right-eye image, graphics driver wrapper 26 may modify the glViewport command to be glViewport (VPshift*cos($\alpha$), VPshift*sin($\alpha$), width+VPshift*cos($\alpha$), height+VPshift*sin($\alpha$)), where (VPshift*cos($\alpha$), VPshift*sin($\alpha$)) is the left-bottom of the right-eye image, and (width+VPshift*cos($\alpha$), height+VPshift*sin($\alpha$)) is the right-top of the right-eye image.

In the above example, the VPshift variable may define the amount of horizontal disparity between the left-eye image and the right-eye image. For example, VPshift may be the horizontal disparity value described above. The horizontal disparity value may indicate the amount by which the viewports of the left-eye image and right-eye image are shifted relative to one another (i.e., the amount of viewport shift), hence the variable VPshift. The viewer may define the value of VPshift to define the location of the zero disparity plane. As another example, processor 22 may be configured to determine the value of VPshift based on an estimation of how far away the viewer is relative to display 12. As another example, application 22 or graphics driver wrapper 26 may be preconfigured with a value for VPshift.

In some examples, graphics driver wrapper 26 may further modify the glViewport commands for the left-eye and right-eye images for viewport stretch. The viewport stretching expands the viewports of the left-eye image and the right-eye image such that there is potentially overlap between the left-eye image and the right-eye image. For example, without viewport stretch, the left-eye image and the right-eye image may be constrained to respective portions on the display, and there may not be overlap. To increase or decrease overlap, application processor 22, via graphics driver wrapper 26, may further modify the glViewport commands to include viewport stretch. The viewport stretching may also affect the location of the zero disparity plane, and may provide for yet another way in which to control the location of the zero disparity plane to the desired location.

Modifying the glViewport command to include viewport stretch is not necessary in every example. Moreover, in accordance with the techniques described in this disclosure, application processor 22, via graphics driver wrapper 26, may modify the glViewport command to include viewport stretch based on the viewing angle. For example, application processor 22, via graphics driver wrapper 26, may modify the glViewport commands as follows. For the viewport of the left-eye image, application processor 22, via graphics driver wrapper 26, may modify the glViewport command to glViewport(−VPshift*cos($\alpha$), −VPshift*sin($\alpha$), width, height). For the viewport of the right-eye image, application processor 22, via graphics driver wrapper 26, may modify the glViewport command to glViewport(0, 0, width+VPshift*cos($\alpha$), height+VPshift*sin($\alpha$)).

As described above, the techniques described in this disclosure may modify the instructions to generate an image for a mono view to generate images for stereoscopic view during execution or run time. For example, a viewer may select application 42 for execution, which may require the execution of vertex shader 38 for processing the graphics generated by the execution of application 42. While application 42 is executing or running on device 10, graphics driver 24, graphics driver wrapper 26, and compiler 28 may perform their respective functions on application processor 22 to cause application processor 22 to modify the source code of vertex shader 38 and generate the object code for modified vertex shader 40. In other words, 3D graphics to S3D graphics conversion is performed in run-time by application processor 22, via graphics driver wrapper 26, rather than needing preprogrammed S3D graphics content or prerecorded S3D images or video.

Also, although the above examples are described in the context where application processor 22, via graphics driver wrapper 26, adds instructions to and modifies the instructions of vertex shader 38 and modifies the instruction that defines the viewport, aspects of this disclosure are not so limited. In some examples, rather than graphics driver wrapper 26, it may be possible for application processor 22, via graphics driver 24 or compiler 28, to modify the instructions of vertex shader 38 and the instructions outputted by application 42. However, these examples may require modification to graphics driver 24 or compiler 28.

Modification to graphics driver 24 or compiler 28 may be more difficult than developing graphics driver wrapper 26 and having application processor 22, via graphics driver wrapper 26, perform the functions described in this disclosure so that GPU 30 generates the left-eye image and the right-eye image for the stereoscopic view. For example, device 10 may have been loaded with preexisting graphics driver 24 and compiler 28, and it may be difficult to change graphics driver 24 and compiler 28. By adding graphics driver wrapper 26 to cause application processor 22 to perform the modification to vertex shader 38, the example techniques may not require modification to preexisting graphics driver 24 and compiler 28.

Furthermore, the techniques described above may allow GPU 30 to generate images for the stereoscopic view without modification to application 42. For example, some other techniques to generate stereoscopic view may require the developers of application 42 to modify the source code of application 42 to generate pixel values for the left-eye and right-eye images. These techniques required assistance from the developer of application 42 to modify their applications for stereoscopic view, which may be potentially cumbersome task for the developer of application 42. The example techniques described above may provide stereoscopic view for application 42, developed for mono view, without any assistance from the developer of application 42.

Moreover, some other techniques have been proposed to convert 3D graphics to S3D graphics in run-time. However, these other techniques may not account for the viewing angle. For instance, in these other techniques, if the viewing angle changes, the resulting stereoscopic view may appear less than ideal. By accounting for the viewing angle, the techniques provide for richer viewing experience regardless of the angle at which the viewer is viewing display 12 or regardless of the angle of display 12.

Also, the techniques described above may not require multiple calls to system memory 26 for generating the left-eye and right-eye images for stereoscopic view. For example, in some other techniques to generate stereoscopic view, a GPU would generate the left-eye image. Upon completion of the generation of the left-eye image, the GPU would utilize depth information stored in system memory 36 while generating the left-eye image to generate the right-eye image. However, repeated calls to system memory 36 to retrieve the depth information may be computationally expensive and may require excessive power consumption.

The example techniques described above may not require such multiple calls to system memory 36 for the depth information for the left-eye image to generate the right-eye image. For example, graphics driver wrapper 26 may modify the source code of vertex shader 38 and the instruction that defines the viewport to generate the left-eye and right-eye images independently from one another, without necessarily needing the depth information of one image to generate the other image.

As described above, graphics driver wrapper 26 may include the gl_Position.x+=($z_{near}$*$w_{world}$/(R−L)/2)*X or just gl_Position.x+=X command into the source code of vertex shader 28 that modifies the value of the gl_Position.x variable, and include the gl_Position.y+=($z_{near}$*$w_{world}$/(T−B)/2)*Y or just gl_Position.x+=Y*width/height, where X equals D*cos($\alpha$) or −D*cos($\alpha$), and Y equals D*sin($\alpha$) or −D*sin($\alpha$). Again, if vertex level adjustment of vertices is desired, graphics driver wrapper 26 may further multiply the X and the Y variables with (1−gl_Position.w/$ZDP_{loc}$), where gl_position.w stores the $w_{clip}$ coordinate, which is equal to −$z_{world}$ and $ZDP_{loc}$ is the desired zero disparity plane location. The following provides the reasons for such an inclusion of instructions into the source code of vertex shader 38.

As indicated above in equation (1), Vclip=PRJ*Veye=PRJ*MVT*Vworld. The equation for Vclip may be modified to generate clipping coordinates for the left-eye and the right-eye. For example, the clipping coordinates for the left-eye and right-eye may be:

$$V\text{clip\_left-eye} = PRJ * V T\text{left-eye} * V\text{eye} = PRJ * V T\text{left-eye} * MVT * V\text{world} \quad \text{(equation 8), and}$$

$$V\text{clip\_right-eye} = PRJ * V T\text{right-eye} * V\text{eye} = PRJ * V T\text{right-eye} * MVT * V\text{world} \quad \text{(equation 9)}.$$

VTleft-eye and VTright-eye may be 4×4 matrices that are based on an assumed distance of the left eye and right eye away from the mono view. The coordinates of the mono view may be (0, 0, 0), and the left eye may be considered as being located at (D*cos($\alpha$), D*sin($\alpha$), 0), as described in equation 6, and the right eye may be considered as being located at (−D*cos($\alpha$), −D*sin($\alpha$), 0). In other words, the (0, 0, 0) location may be considered as being in the middle of the right eye and the left eye of the viewer. If the left eye is considered to be located (D*cos($\alpha$), D*sin($\alpha$)) away from the middle of the right eye and the left eye, and right eye is considered to be located (−D*cos($\alpha$), −D*sin($\alpha$)) away from the middle of the right eye and the left eye, then D indicates half of the distance between the right eye and left eye of the viewer, and alpha, $\alpha$, indicates the viewing angle.

The matrices for VTleft-eye and VTright-eye may be defined as:

$$VT_{left\_eye} = \begin{bmatrix} 1 & 0 & 0 & D*\cos(\text{alpha}) \\ 0 & 1 & 0 & D*\sin(\text{alpha}) \\ 0 & 0 & 1 & 0 \\ 0 & 0 & 0 & 1 \end{bmatrix} \text{ and}$$

$$VT_{right\_eye} = \begin{bmatrix} 1 & 0 & 0 & -D*\cos(\text{alpha}) \\ 0 & 1 & 0 & -D*\sin(\text{alpha}) \\ 0 & 0 & 1 & 0 \\ 0 & 0 & 0 & 1 \end{bmatrix}$$

VTleft-eye and VTright-eye may be rewritten as a sum of two matrices. For example, VTleft-eye may be rewritten as $$VT_{left\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & D*\cos(\text{alpha}) \\ 0 & 0 & 0 & D*\sin(\text{alpha}) \\ 0 & 0 & 0 & 0 \\ 0 & 0 & 0 & 0 \end{bmatrix}.$$

VTright-eye may be rewritten as $$VT_{right\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & -D*\cos(\text{alpha}) \\ 0 & 0 & 0 & -D*\sin(\text{alpha}) \\ 0 & 0 & 0 & 0 \\ 0 & 0 & 0 & 0 \end{bmatrix}.$$

By substituting the VTleft-eye matrix into the equation for Vclip_left-eye (equation 7), Vclip_left-eye equals:

$$V\text{clip\_left-eye} = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * V\text{world} + \quad \text{(equation 10)}$$

$$PRJ * \begin{bmatrix} 0 & 0 & 0 & D*\cos(\text{alpha}) \\ 0 & 0 & 0 & D*\sin(\text{alpha}) \\ 0 & 0 & 0 & 0 \\ 0 & 0 & 0 & 0 \end{bmatrix} * MVT * V\text{world}.$$

By substituting the VTright-eye matrix into the equation for Vclip_right-eye (equation 8), Vclip_right-eye equals:

$$V\text{clip\_right-eye} = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * V\text{world} + \quad \text{(equation 11)}$$

$$PRJ * \begin{bmatrix} 0 & 0 & 0 & -D*\cos(\text{alpha}) \\ 0 & 0 & 0 & -D*\sin(\text{alpha}) \\ 0 & 0 & 0 & 0 \\ 0 & 0 & 0 & 0 \end{bmatrix} * MVT * V\text{world}.$$

In both equations 10 and 11 (e.g., for Vclip_left-eye and Vclip_right-eye)

$$PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * V\text{world}$$

can be simplified to PRJ*MVT*Vworld because $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

is a unity matrix and is equivalent to multiplying by one.

As described above in equation 1, PRJ*MVT*Vworld equals Vclip. Therefore, the Vclip_left-eye and Vclip_right-eye equations (e.g., equations 10 and 11, respectively) can be rewritten as:

$$V\text{clip\_left-eye} = \quad \text{(equation 12)}$$

$$V\text{clip} + PRJ * \begin{bmatrix} 0 & 0 & 0 & D*\cos(\text{alpha}) \\ 0 & 0 & 0 & D*\sin(\text{alpha}) \\ 0 & 0 & 0 & 0 \\ 0 & 0 & 0 & 0 \end{bmatrix} * MVT * V\text{world}$$

and, $$V\text{clip\_right-eye} = V\text{clip} + \quad \text{(equation 13)}$$

$$PRJ * \begin{bmatrix} 0 & 0 & 0 & -D*\cos(\text{alpha}) \\ 0 & 0 & 0 & -D*\sin(\text{alpha}) \\ 0 & 0 & 0 & 0 \\ 0 & 0 & 0 & 0 \end{bmatrix} * MVT * V\text{world}.$$

By substituting the matrices for the PRJ and MVT (equations 4 and 5, respectively), and performing the matrix multiplication of equation 11, the equation for Vclip_left-eye may simplify to:

Vclip_left-eye =

$$Vclip + \begin{bmatrix} 0 & 0 & 0 & (znear/((R-L)/2))*D*\cos(\text{alpha}) \\ 0 & 0 & 0 & (znear/((T-B)/2))*D*\sin(\text{alpha}) \\ 0 & 0 & 0 & 0 \\ 0 & 0 & 0 & 0 \end{bmatrix} * Vworld.$$

Substituting for Vworld:

Vclip_left-eye =

$$Vclip + \begin{bmatrix} 0 & 0 & 0 & (znear/((R-L)/2))*D*\cos(\text{alpha}) \\ 0 & 0 & 0 & (znear/((T-B)/2))*D*\sin(\text{alpha}) \\ 0 & 0 & 0 & 0 \\ 0 & 0 & 0 & 0 \end{bmatrix} * \begin{bmatrix} x_{world} \\ y_{world} \\ z_{world} \\ w_{world} \end{bmatrix}.$$

By multiplying the matrices, the resulting value for Vclip_left-eye equals:

$$\text{Vclip\_left-eye} = Vclip + \begin{bmatrix} ((znear/((R-L)/2)*D*\cos(\text{alpha})*w_{world}) \\ ((znear/((T-B)/2)*D*\sin(\text{alpha})*w_{world}) \\ 0 \\ 0 \end{bmatrix}.$$

More specifically:

$$\text{Vclip\_left-eye} = \begin{bmatrix} x_{clip\_left\text{-}eye} \\ y_{clip\_left\text{-}eye} \\ z_{clip\_left\text{-}eye} \\ w_{clip\_left\text{-}eye} \end{bmatrix} =$$

$$\begin{bmatrix} xclip + ((znear/((R-L)/2)*D*\cos(\text{alpha})*w_{world}) \\ yclip + ((znear/((T-B)/2)*D*\sin(\text{alpha})*w_{world}) \\ zclip \\ wclip \end{bmatrix}.$$

In the above equation of Vclip_left-eye, $x_{clip}$ is the x-clipping coordinate for the single image, and $y_{clip}$ is the y-clipping coordinate for the single image. The $((z_{near}/((R-L)/2)*D*\cos(\alpha)*w_{world}$ the value added to the $x_{clip}$ for the left-eye image. The $((z_{near}/((T-B)/2)*D*\sin(\alpha)*w_{world}$ is the value added to the $y_{clip}$ for the left-eye image. The $z_{near}$ and $w_{world}$ values are the same as for the single image generated by application 42. The values added to $x_{clip}$ and $y_{clip}$ are based on the viewing angle ($\alpha$) and the ratio between the width and height of display 12.

With similar substitutions to those for Vclip_left-eye, the Vclip_right-eye equation may simplify to:

Vclip_right-eye = (equation 14)

$$Vclip - \begin{bmatrix} ((znear/((R-L)/2)*D*\cos(\text{alpha})*w_{world}) \\ ((znear/((T-B)/2)*D*\sin(\text{alpha})*w_{world}) \\ 0 \\ 0 \end{bmatrix}.$$

More specifically:

(equation 15)

$$\text{Vclip\_right-eye} = \begin{bmatrix} x_{clip\_right\text{-}eye} \\ y_{clip\_right\text{-}eye} \\ z_{clip\_right\text{-}eye} \\ w_{clip\_right\text{-}eye} \end{bmatrix} =$$

$$\begin{bmatrix} xclip + ((znear/((R-L)/2)*D*\cos(\text{alpha})*w_{world}) \\ yclip + ((znear/((T-B)/2)*D*\sin(\text{alpha})*w_{world}) \\ zclip \\ wclip \end{bmatrix}.$$

From equations 14 and 15, it can be seen that by adding the constant $$\frac{z_{near}}{(R-L)/2} * D * \cos(\text{alpha}) * w_{world}$$

to the calculated $x_{clip}$ coordinate and adding the constant $$\frac{z_{near}}{(T-B)/2} * D * \sin(\text{alpha}) * w_{world}$$

to the calculated $y_{clip}$, and keeping all other clipping coordinates the same, vertex shader 38 may generate the clipping coordinates for the left-eye image. Similarly, by subtracting the constant $$\frac{z_{near}}{(R-L)/2} * D * \cos(\text{alpha}) * w_{world}$$

from the $x_{clip}$ coordinate and subtracting the constant $$\frac{z_{near}}{(T-B)/2} * D * \sin(\text{alpha}) * w_{world}$$

from the $y_{clip}$ coordinate, and keeping all other clipping coordinates the same, vertex shader 38 may generate the clipping coordinates for the right-eye image. For at least these reasons, graphics driver wrapper 16 may include the instruction gl_Position.x+=$z_{near}$*$w_{world}$/((R-L)/2)*X, where X equals +D*cos($\alpha$) and the instruction gl_Position.y+=$z_{near}$*$w_{world}$/((T-B)/2)*Y, where Y equals +D*sin($\alpha$) to generate the left-eye image, and where X equals -D*cos($\alpha$) and Y equals -D*sin($\alpha$) to generate the right-eye image.

In some examples, it may be possible to further simplify the gl_Position.x+=command to just gl_Position.x+=X. For example, it is common for the $w_{world}$ variable to be set to 1. Also, OpenGL, OpenGL ES, and OpenGL ES 2.0, with programmable shaders, define a frustum to be:

$$\cot(fov_x) = \frac{z_{near}}{(R-L)/2},$$

where $fov_x$ is a frustum defined in OpenGL, OpenGL ES, and OpenGL ES 2.0. It is also common for the viewing angle to be set to 45 degrees, which means that $\cot(fov_x)$ equals 1. This means that $$\frac{z_{near}}{(R-L)/2}$$

equals 1. Therefore, in these examples, $$\frac{z_{near} * w_{world}}{(R-L)/2} * X$$

simplifies to just X (e.g., $$\frac{z_{near}}{(R-L)/2}$$

equals 1, and $w_{world}$ equals 1). In these examples, the gl_Position.x+=variable may simplify to gl_Position.x+=X.

Also, width of display 12 may equal R−L, and the height of display 12 may equal T−B. Therefore, the instruction gl_Position.y+=$z_{near}$*$w_{world}$/((T−B)/2)*Y may simplify down to the instruction gl_Position.y+=Y*width/height.

Accordingly, the above equations provide mathematical foundation that illustrates the reasons why adding the instruction gl_Position.x+=($z_{near}$*$w_{world}$/(R−L)/2)*X, or gl_Position.x+=X and gl_Position.y+=($z_{near}$*$w_{world}$/(T−B)/2)*Y, or gl_Position.y+=Y to vertex shader 38 may be sufficient to displace the mono view image to generate stereoscopic view based on the viewing angle, when executed twice, and where X equals +D*cos($\alpha$) and Y equals +D*sin($\alpha$), in the first execution, and where X equals −D*cos($\alpha$) and Y equals −D*sin($\alpha$) in the second execution. Furthermore, even in examples where ($z_{near}$*$w_{world}$/(R−L)/2) does not equal 1, and in examples where ($z_{near}$*$w_{world}$/(T−B)/2) does not equal width/height, the $z_{near}$*$w_{world}$/(R−L)/2*D may be a constant value whose value the viewer may select, and similarly the $z_{near}$*$w_{world}$/(T−B)/2*D may be constant value whose value the viewer may select.

In other words, in the techniques described in this disclosure, the actual values of $z_{near}$, $w_{world}$, R, L, T, B, and D may not be needed. Rather, the viewer may select a first value for $z_{near}$*$w_{world}$/(R−L)/2*D, and a second value for $z_{near}$*$w_{world}$/(R−L)/2*D. Graphics driver wrapper 26 may multiply the first value with cos($\alpha$), and provide the resulting value to vertex shader 38. The gl_Position.x+=command in vertex shader 38, which graphics driver wrapper 26 included in vertex shader 38, may add the provided value by graphics driver wrapper 26 to the current value of gl_Position.x to determine the x-clipping coordinate of the vertex in the first execution of the object code of modified vertex shader 40 for the left-eye image. Also, graphics driver wrapper 26 may multiply the second value with sin($\alpha$), and provide the resulting value to vertex shader 38. The gl_Position.y+=command in vertex shader 38, which graphics driver wrapper 26 included in vertex shader 38, may add the provided value by graphics driver wrapper 26 to the current value of gl_Position.y to determine the y-clipping coordinate of the vertex in the first execution of the object code of modified vertex shader 40 for the left-eye image.

Similarly, graphics driver wrapper 26 may multiply the first value with −1 and cos($\alpha$), and provide the resulting value to vertex shader 38. The gl_Position.x+=command in vertex shader 38, which graphics driver wrapper 26 included in vertex shader 38, may add the provided value by graphics driver wrapper 26 to the current value of gl_Position.x to determine the x-clipping coordinate of the vertex in the second execution of the object code of modified vertex shader 40 for the right-eye image. Also, graphics driver wrapper 26 may multiply the second value with −1 and sin($\alpha$), and provide the resulting value to vertex shader 38. The gl_Position.y+=command in vertex shader 38, which graphics driver wrapper 26 included in vertex shader 38, may add the provided value by graphics driver wrapper 26 to the current value of gl_Position.y to determine the y-clipping coordinate of the vertex in the second execution of the object code of modified vertex shader 40 for the right-eye image.

In some examples, the viewer may select the values of first value and the second value for the modification of gl_Position.x+=command and the gl_Position.y+=command and/or the values of VPshift and $ZDP_{loc}$. This may allow the viewer to fine tune the stereoscopic effect as desired. For example, the viewer may be able to personalize the stereoscopic effect by defining the amount by which vertices are displaced and the location of the zero disparity plane.

In this way, the techniques of this disclosure may provide for a minor modification to vertex shader 38, which is designed for mono view, such that when the modified vertex shader is compiled and executed (e.g., the execution of the object code of modified vertex shader 40), the resulting images may provide the viewer with a stereoscopic view. The stereoscopic view may provide the viewer with a 3D experience, which may be richer, fuller experience, as compared to viewing an image limited by the 2D area of the display.

Figure 6:
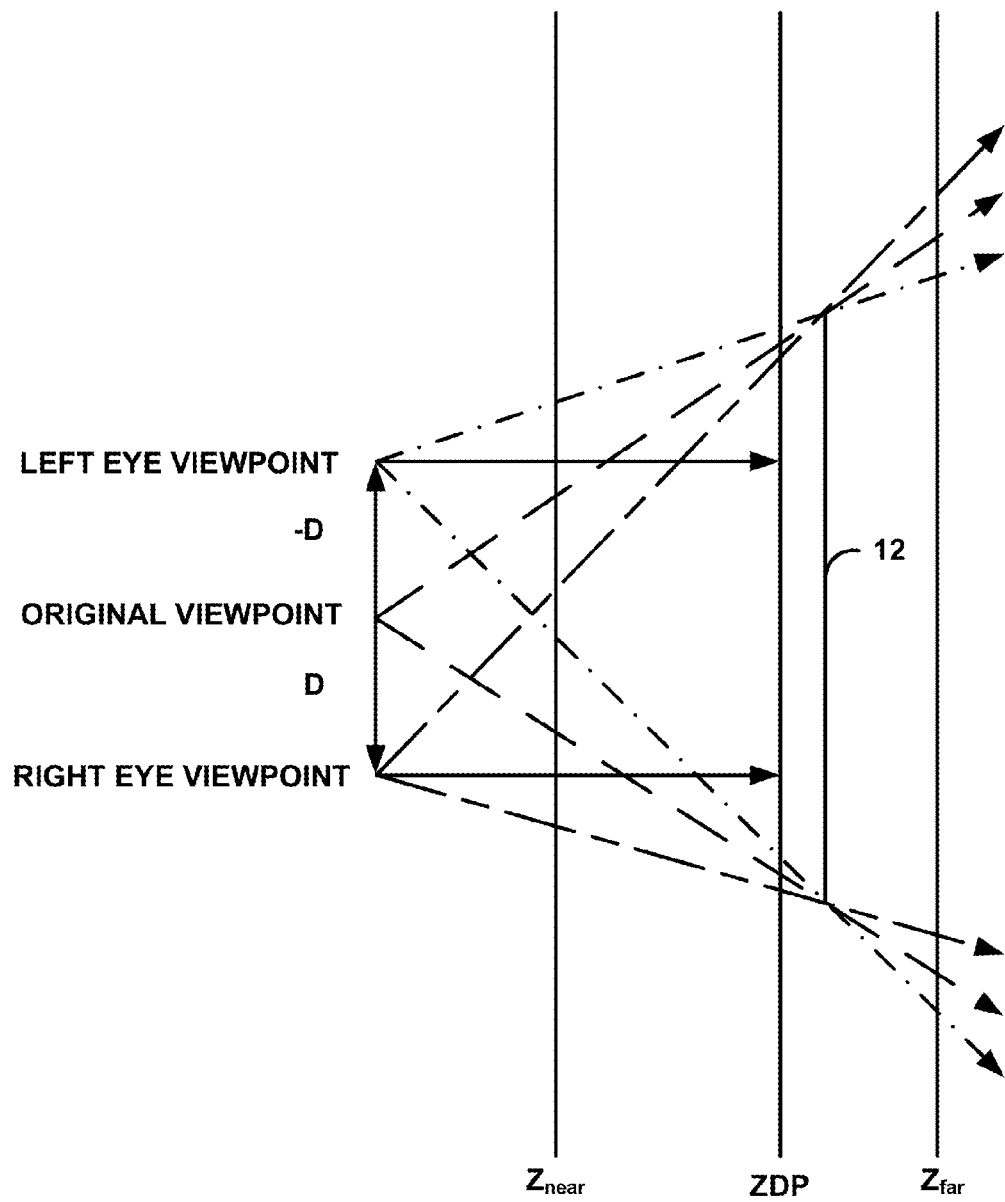
FIG. 6 is a conceptual diagram illustrating a location of a zero disparity plane.

FIG. 6 is a conceptual diagram illustrating a location of a zero disparity plane. For example, the location of the original viewpoint may be the (0, 0, 0) location. The left eye may be a distance D away from the original viewpoint, and right eye may be a distance −D away from the original viewpoint. For example, the left eye may be located at (−D*cos($\alpha$), −D*sin($\alpha$)), and the right eye may be located at (D*cos($\alpha$), D*sin($\alpha$)).

The angled lines extending from the left eye viewpoint and the right eye viewpoint illustrate the area that the left eye and right eye see, respectively. The straight lines extending from the left eye viewpoint and right eye viewpoint illustrate the orientation of the viewer relative to the orientation of display 12 (i.e., the viewing angle). In this example, the viewing angle is zero.

As illustrated in FIG. 6, the location of the ZDP is in front of display 12, and within the $z_{near}$ and $z_{far}$ clipping planes defined by application 42. The location of the ZDP may be based on two factors. One factor may be the selected value of D. Another factor may be the value of VPshift (i.e., the horizontal disparity value) which indicates the disparity between the left-eye image and the right-eye image. By selecting the value of D and VPshift, the viewer may select the desired location of the ZDP. In these examples, all objects in the image generated by application 42 may appear within the ZDP (e.g., in front of display 12, rather than being constrained to within the surface of display 12). As described above, it may be possible for application processor 22 to determine the value of D and VPshift.

Moreover, in some examples, the VPshift may not be necessary, and the viewer or application processor 22 may determine the location of ZDP. In these examples, graphics driver wrapper 26 may modify the values stored in the gl_Position.x and gl_Position.y variables based on the location of the ZDP so that some objects appear ahead of the ZDP, some objects appear at the ZDP, and other objects appear behind the ZDP.

Figure 7:
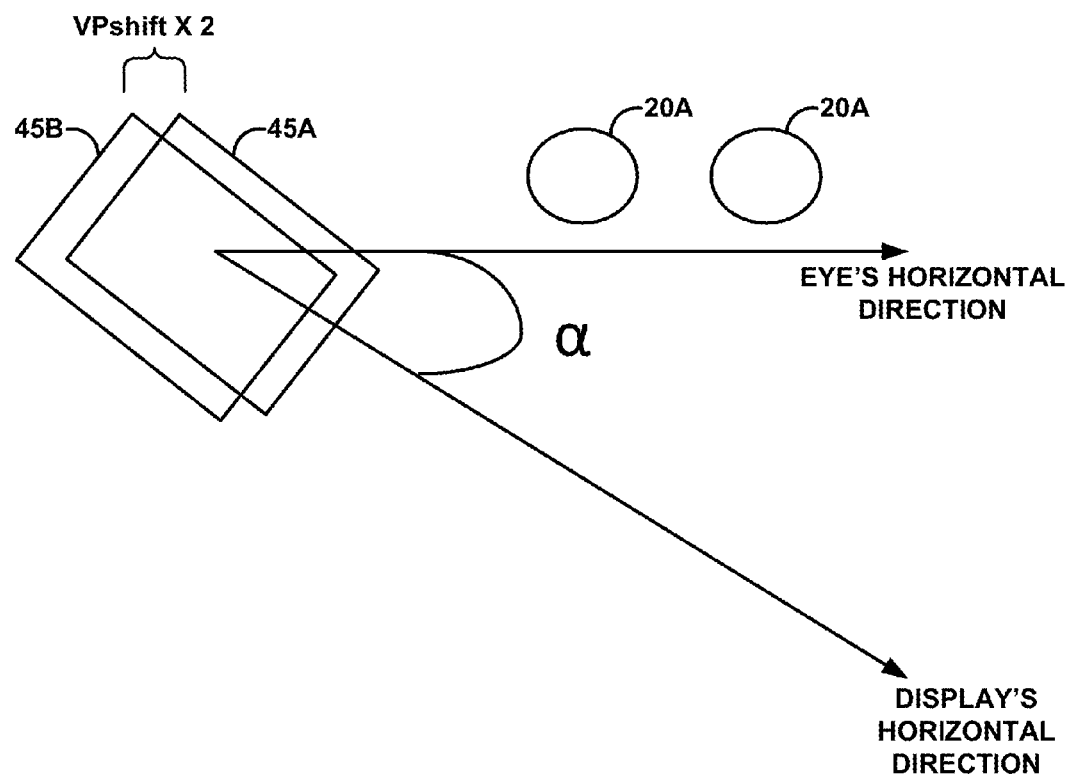
FIG. 7 is a conceptual diagram illustrating the horizontal disparity between the left-eye image and the right-eye image in accordance with one or more example techniques described in this disclosure.

FIG. 7 is a conceptual diagram illustrating the horizontal disparity between the left-eye image and the right-eye image in accordance with one or more example techniques described in this disclosure. For example, FIG. 7 illustrates right-eye image 45A and left-eye image 45B. The horizontal disparity is indicated to be VPshift*2 in this example. As shown in FIG. 7, the horizontal disparity is at the image level (i.e., the disparity between all vertices in right-eye image 45A and left-eye image 45B is the same). As described above, application processor 22 or the viewer may select the value of VPshift. By selecting the value of VPshift, the viewer or application processor 22 may define the location of the zero disparity plane.

Figure 8:
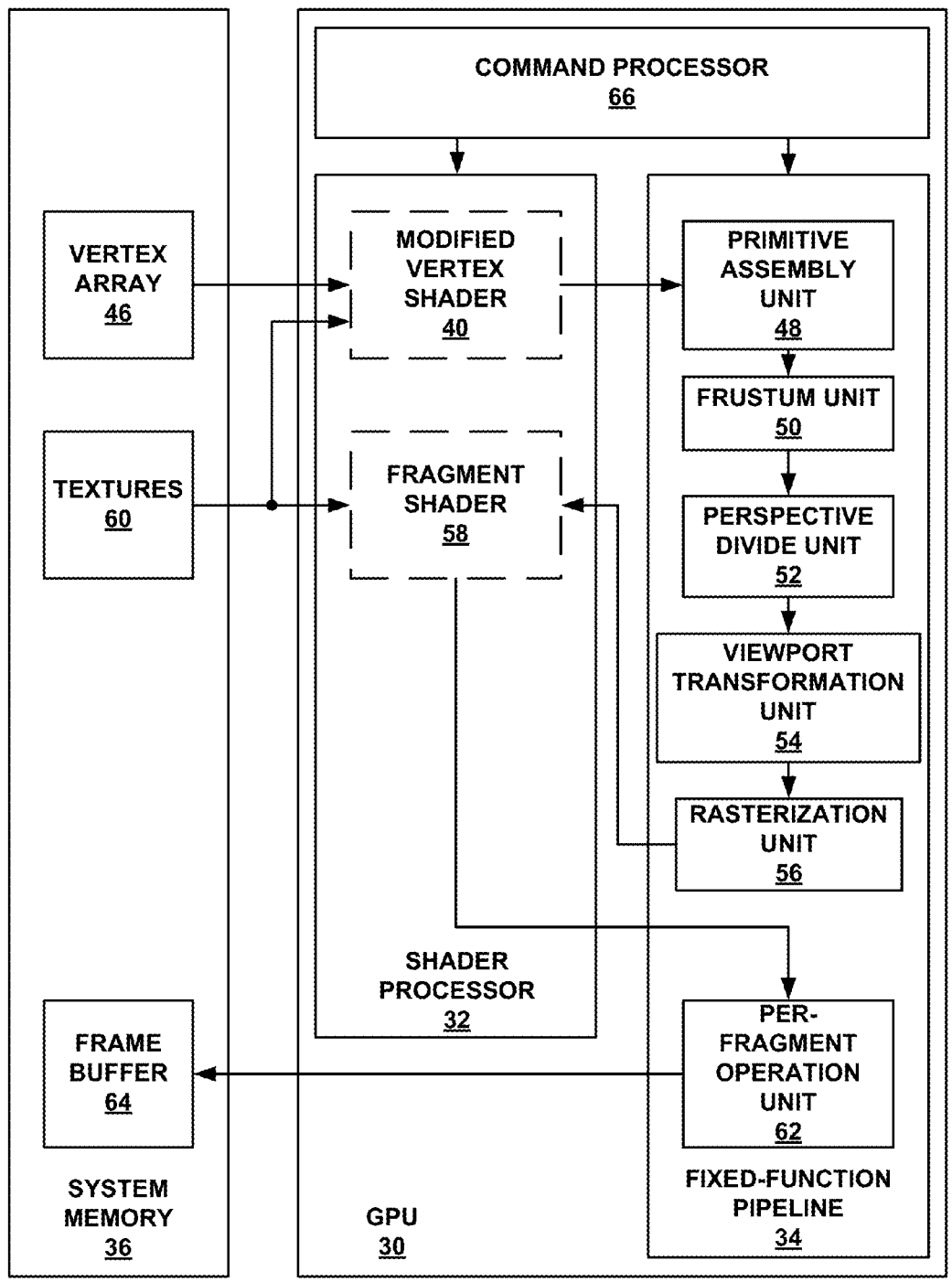
FIG. 8 is a block diagram illustrating an example of a graphics processing unit (GPU) that may implement one or more example techniques described in this disclosure.

FIG. 8 is a block diagram illustrating an example of a graphics processing unit (GPU) that may implement one or more example techniques described in this disclosure. For example, FIG. 8 illustrates the components of GPU 30 in greater detail. As illustrated in FIG. 8, GPU 30 includes command processor 66, shader processor 32, and fixed-function pipeline 34. Command processor 66 may function as the interface between GPU 30 and application processor 22. For instance, command processor 66 may receive commands from application processor 22, and may determine whether the commands should be forwarded to shader processor 32 or fixed-function pipeline 34. As another example, command processor 66 may receive the viewing angle from application processor 22.

As one example, as described above, application processor 22, executing application 42, may instruct GPU 30 to execute the object code of modified vertex shader 40. In this example, command processor 66 may receive the command from application processor 22, and may instruct shader processor 32 to execute the object code of modified vertex shader 40. As another example, in some examples, as described above, graphics driver wrapper 26 may modify the glViewport command issued by application 42, and provide the modified glViewport commands to GPU 30. In this example, command processor 66 may receive the modified glViewport commands, and determine that this command is for viewport transformation unit 54 of fixed-function pipeline 34. Command processor 66 may forward the modified glViewport commands to viewport transformation unit 54 for applying the viewports for the left-eye image and right-eye image.

For example, as described above, application 42 may issue a glDraw command that graphics driver wrapper 26 blocks from transmission to GPU 30. The glDraw command may trigger graphics driver wrapper 26 into issuing a first instruction to shader processor 42 to execute the object code of modified vertex shader 40. In turn, shader processor 42 executes the object code of modified vertex shader 40, and stores the resulting clipping coordinates in its local memory or system memory 36.

The glDraw command also causes graphics driver wrapper 26 to issue a first glViewport instruction, which is received by command processor 66. In examples where image level adjustment of the horizontal disparity between the left-eye and right-eye images is not needed, graphics driver wrapper 26 may not modify the first glViewport command. In examples where image level adjustment of the horizontal disparity between left-eye and right-eye images is needed, graphics driver wrapper 26 may modify the first glViewport command based on the viewing angle and the value of VPshift.

Then, graphics driver wrapper 26 issues the first glDraw command which is received by command processor 66. Command processor 66, in response, causes the fixed-function units of fixed-function pipeline 34 and shader processor 32 to perform their respective functions to generate the graphics content for a first image of the stereoscopic view (e.g., the left-eye image). For example, as discussed in more detail, in response to the first glDraw command, and when image level adjustment of the horizontal disparity is desired, viewport transformation unit 54 constrains the first image to a first portion of the display, and per-fragment operation unit 62 outputs the graphics content of the first image to frame buffer 64.

After the first image of the stereoscopic view is stored in frame buffer 64, GPU 30 repeats the steps to generate the graphics content for the second image of the stereoscopic view. For example, graphics driver wrapper 26 issues a second instruction to shader processor 32 to execute the object code of modified vertex shader 40. In turn, shader processor 32 executes the object code of modified vertex shader 40, and stores the resulting clipping coordinates in its local memory or system memory 36. Graphics driver wrapper 26 also issues a second glViewport instruction, which is received by command processor 66. Again, the glViewport instruction may be modified if adjustment of disparity at the image level is desired, and may not be modified if adjustment of disparity at the image level is not desired.

Then, graphics driver wrapper 26 issues the second glDraw command which is received by command processor 66. Command processor 66, in response, causes the fixed-function units of fixed-function pipeline 34 and shader processor 32 to perform their respective functions to generate the graphics content for a second image of the stereoscopic view (e.g., the right-eye image). For example, in response to the second glDraw command, and when image level adjustment of the horizontal disparity is desired, viewport transformation unit 54 constrains the second image to a second portion of the display, and per-fragment operation unit 62 outputs the graphics content of the second image to frame buffer 64.

As illustrated in dashed boxes in FIG. 8, shader processor 32 includes modified vertex shader 40 and fragment shader 58. The dashed boxes are to indicate that shader processor 32 may not actually include modified vertex shader 40 and fragment shader 58. Rather, shader processor 32 may execute the object code of modified vertex shader 40 and fragment shader 58. The object of modified vertex shader 40 and fragment shader 58 may be stored in system memory 36.

Fixed-function pipeline 34 may include one or more fixed-function units such as primitive assembly unit 48, frustum unit 50, perspective divide unit 52, viewport transformation unit 54, rasterization unit 56, and per-fragment operation unit 62. Each of these fixed-function units of fixed-function pipeline 34 may be hardware units that are hardwired to perform specific graphics related functions. Although these fixed-function units of fixed-function pipeline 34 are illustrated as separate components, aspects of this disclosure are not so limited. One or more of the fixed-function units of fixed-function pipeline 34 may be combined together into a common fixed-function unit. Also, there may be more fixed-function units of fixed-function pipeline 34 than those illustrated in FIG. 8. The one or more fixed-function units of fixed-function pipeline 34 are illustrated separately to ease understanding.

Moreover, the specific ordering of the fixed-function units of fixed-function pipeline 34 is illustrated for example purposes and should not be considered limiting. For instance, it may be possible to reorder the fixed-function units of fixed-function pipeline 34. As one example, one of the functions of per-fragment operation unit 62 may be to cull pixels that are occluded by overlapping pixels. It may be possible for this function to be performed earlier in fixed-function pipeline 34.

These fixed-function units of fixed-function pipeline 34 may provide very limited functional flexibility, as compared to shader processor 32. For example, shader processor 32 may be specifically designed to execute programmable shader programs such as modified vertex shader 40 and fragment shader 58. These shader programs cause shader processor 32 to function in the manner defined by the shader programs. In other words, shader programs may define the functionality of shader processor 32, whereas the functionality of the fixed-function units of fixed-function pipeline 34 is set.

As described above, graphics driver wrapper 26 may instruct GPU 30 to execute the object code of modified vertex shader 40 twice, where the first execution is for the generation of clipping coordinates for vertices of one of the images of stereoscopic view based on the viewing angle (e.g., left-eye image) and the second execution is for the generation of clipping coordinates for vertices of the other image of stereoscopic view (e.g., right-eye image) based on the viewing angle. In response, to each of these instructions to execute the object code of modified vertex shader 40, command processor 66 may instruct shader processor 32 to retrieve the object code of modified vertex shader 40 and execute the object code of modified vertex shader 40. As described above, compiler 28 may compile the source code of the modified vertex shader and store the resulting object code as the object code of modified vertex shader 40.

As illustrated in FIG. 8, modified vertex shader 40 may receive vertex array 46 and textures 60 as inputs. Vertex arrays 46 may include information to generate the pixel values for the vertices generated by application 42 (e.g., the coordinates of the vertices, color values of the vertices, and transparency values of the vertices), as described above. For example, the coordinates of the vertices of vertex array 46 may be the world coordinates as defined by application 42. Textures 60 may be pixel values for textures that overlay over the generated graphics to provide a more realistic view of the graphics content.

Modified vertex shader 40, executing on shader processor 32, may generate the clipping coordinates for each of the vertices. For example, modified vertex shader 40 may convert the world coordinates of the vertices as defined by application 42 and stored in vertex array 46 into clipping coordinates for each of the vertices by performing the matrix multiplication of equation 1, as discussed above with respect to FIG. 1. Furthermore, modified vertex shader 40, executing on shader processor 32, may update the gl_Position.x and the gl_Position.y variables, based on the viewing angle, for the clipping coordinates of each of the vertices to provide the displacement for the left-eye image, in the first execution of the object code of modified vertex shader 40, and to provide the displacement for the right-eye image, in the second execution of the object code of modified vertex shader 40. Also, modified vertex shader 40 may perform additional, conventional vertex shader tasks. For example, modified vertex shader 40 may perform lighting functions on the vertices.

After modified vertex shader 40 performs the model view transformation (e.g., conversion of the world view coordinates to clipping coordinates, including the displacement with the gl_Position.x+=command and the gl_Position.y+=command), modified vertex shader 40 provides the clipping coordinates for the vertices to primitive assembly unit 48 of fixed-function pipeline 34. Primitive assembly unit 48 may utilize the clipping coordinates for the vertices to assemble the vertices into primitives. For example, primitive assembly unit 48 may assemble a plurality of triangles based on the clipping coordinates for the vertices, where the vertices of each of the triangles correspond to vertices received from modified vertex shader 40. The plurality of triangles is one example of primitives. In general, primitive assembly unit 48 may assemble the received vertices into any polygon based on the clipping coordinates for the received vertices.

Primitive assembly unit 48 may transmit the assembled primitives to frustum unit 50. Frustum unit 50 may determine whether the assembled primitives are within a view volume. For example, as described above, OpenGL, OpenGL ES, and OpenGL ES 2.0 may define a particular view volume as (fov$_x$). However, the frustum may be user definable using, for example, the glFrustum function. Frustum unit 50 may determine whether a primitive is fully within the view volume, fully external to the view volume, or partially within the view volume and partially external to the view volume. Frustum unit 50 may cull, from further processing, primitives that are fully external to the view volume and portions of primitives are that external to the view volume. Frustum unit 50 may keep, for further processing, primitives that are fully within the view volume and portions of primitives that are within the view volume.

Frustum unit 50 may transmit the remaining primitives and portions of primitives to perspective divide unit 52. Perspective divide unit 52 may expand or shrink primitives based on their depth. For example, each of the primitives may be defined by x, y, and z coordinates. The z coordinate may indicate how close or away the primitive is. It should be noted that at this stage, GPU 30 is generating graphics content for one of the images for the stereoscopic view. Therefore, the concept of proximity of a primitive is in the context of a mono view, not a stereoscopic view.

For instance, perspective divide unit 52 may shrink some primitives, and expand other primitives. This may create a perception that the shrunk primitives are further away compared to the expanded primitives in a mono view. As described above, it is when these mono view images are displayed that the viewer perceives stereoscopic view. In other words, perspective divide unit 52 may cause the left-eye image and the right-eye image to be 3D images that are displayed in the 2D area of the display. When the viewer views these 3D images, the displacement caused by the addition of the gl_Position.x+=command and the gl_Position.y+=command, in the left-eye image and the right-eye image, causes the viewer to perceive the stereoscopic 3D (S3D) image that encompasses a 3D volume.

Perspective divide unit 52 may transmit the primitives to viewport transformation unit 54. Viewport transformation unit 54 modifies the size and location of the image to fit the defined viewport. For example, prior to viewport transformation unit 54, modified vertex shader 40 and the fixed-function units of fixed-function pipeline 34 process graphics data as if the image is to be displayed on the entirety of the display. The function of viewport transformation unit 54 may be to modify the size and location of the image so that the image is constrained to the defined viewport.

It should be understood that in examples where vertex level adjustment of the disparity between vertices in the left-eye image and the right-eye image is desired, viewport transformation unit 54 may define the viewport of the left-eye image to be the same as the viewport of the single image defined by application 42. Similarly, in this example, viewport transformation unit 54 may define the viewport of the right-eye image to be the same as the viewport of the single image defined by application 42. In examples where vertex level adjustment of the disparity between vertices in the left-eye image and right-eye image is not desired, viewport transformation unit 54 may constrain the left-eye image to one portion as defined by the modified glViewport command, and constrain the right-eye image to another portion as defined by the modified glViewport command.

For instance, as described above, after the first execution of the object code of vertex shader 40, which may generate graphics content for the left-eye image (e.g., clipping coordinates for vertices), graphics driver wrapper 26 may modify the viewport of the left-eye image to constrain the left-eye image to one portion of display 12 (e.g., left half of display 12). For example, after the first execution of the object code of vertex shader 40, graphics driver wrapper 26 may modify the glViewport (0, 0, width, length) command, which was previously issued by application 42 and blocked from GPU 30, to glViewport (−VPshift*cos(α), −VPshift*sin(α), width−Vpshift*cos(α), height−Vpshift*sin(α)), and provide this first modified glViewport command to GPU 40. Command processor 66 may provide the first modified glViewport command to viewport transformation unit 54. Viewport transformation unit 54 may then modify the sizes of the primitives received from perspective divide unit 52 so that these primitives are constrained to one half of the display, in this example.

After the second execution of the object code of vertex shader 40, viewport transformation unit 54 may perform similar functions, but for the right-eye image. For example, the second execution of the object code of vertex shader 40 may be for the generation of graphics content for the right-eye image (e.g., clipping coordinates for vertices). After this second execution of the object code of vertex shader 40, graphics driver wrapper 26 may modify the glViewport (0, 0, width, length) command, which was previously issued by application 42 and blocked from GPU 30, to glViewport (VPshift*cos(α), VPshift*sin(α), width+VPshift*cos(α), height+VPshift*sin(α)), and provide this second modified glViewport command to GPU 30. Command processor 66 may forward the second modified glViewport command to viewport transformation unit 54. In this way, GPU 40 may be operable to generate left-eye and right-eye images for the stereoscopic view from a mono view image generated by application 32 during run-time of application 32, and without relying on depth information to generate the right-eye image from the left-eye image, and vice versa.

Viewport transformation unit 54 may forward the primitives to rasterization unit 56 after modifying the viewport after each of the first modified glViewport command and the second modified glViewport command. Rasterization unit 56 may convert the primitives into pixels of the display. For example, rasterization unit 56 may determine which pixels of the display are encompassed by each of the primitives. Rasterization unit 56 may also determine the location of each of these pixels on the displays.

Rasterization unit 56 may output its graphics data to fragment shader 58. Fragment shader 58, sometimes referred to as a pixel shader, may be a shader program that executes on shader processor 32. For example, the source code for fragment shader 58 may be stored in system memory 36, and compiler 28 may compile the source code of fragment shader 58 to generate the object code of fragment shader 58. Alternatively, system memory 36 may store the object code for fragment shader 58 without it necessarily being generated by compiler 28.

Fragment shader 58 may output the color values for each of the pixels on the display. For example, fragment shader 58 may define the color of each pixel based on a red-green-blue (RGB) component. Fragment shader 58 may utilize 8-bits to define the red component, 8-bits to define the green component, and 8-bits to define the blue component, as one illustrative example. Fragment shader 58 may output the color values to per-fragment operation unit 62.

Per-fragment operation unit 62 may cull pixels that are not viewable. For example, a pixel of a further away object may be overlapped by a pixel of a closer object, which per-fragment operation unit 62 may determine from a z-buffer. The overlapping may cause the pixel of the further away object to be fully occluded. In this case, per-fragment operation unit 62 may cull the overlapped pixel. Per-fragment operation unit 62 may also blend pixels together. For example, an overlapping pixel may be translucent so that it does not fully occlude the overlapped pixel. In this case, per-fragment operation unit 62 may blend the color of these pixels together.

The output of per-fragment operation unit 62 may be pixel values (e.g., color) for the pixels on the display. Per-fragment operation unit 62 may output the pixel values to frame buffer 64, of system memory 36, for temporary storage. Frame buffer 64 may store the pixel values for each of the pixels on the display.

Frame buffer 64 may be considered as a 2D array of storage locations. The number of storage locations with frame buffer 64 may be twice the number of pixels of display 12. Also, two storage locations within frame buffer 64 may correspond to one location on the display. For example, frame buffer 64 may include two halves, where each half includes storage locations for the entirety of display 12. In this example, the top-left storage location within the first half and the top-left storage location within the second half within frame buffer 64 may correspond to the top-left pixel of the display, the storage location to the right of the top-left storage location within the first half and the storage location to the right of the top-left storage location within the second half within frame buffer 64 may correspond to the pixel to the right of the top-left pixel of the display, and so forth.

After the completion of the first glDraw command, the storage locations located in the first half frame buffer 64 may store the pixel values for the left-eye image. Similarly, after the completion of the second glDraw command, the storage locations located in the second half of frame buffer 64 may store the pixel values for the right-eye image. Therefore, after completion of the first and second glDraw commands, frame buffer 64 may store the pixel values for the left-eye image and the pixel values for the right-eye image.

Figure 9:
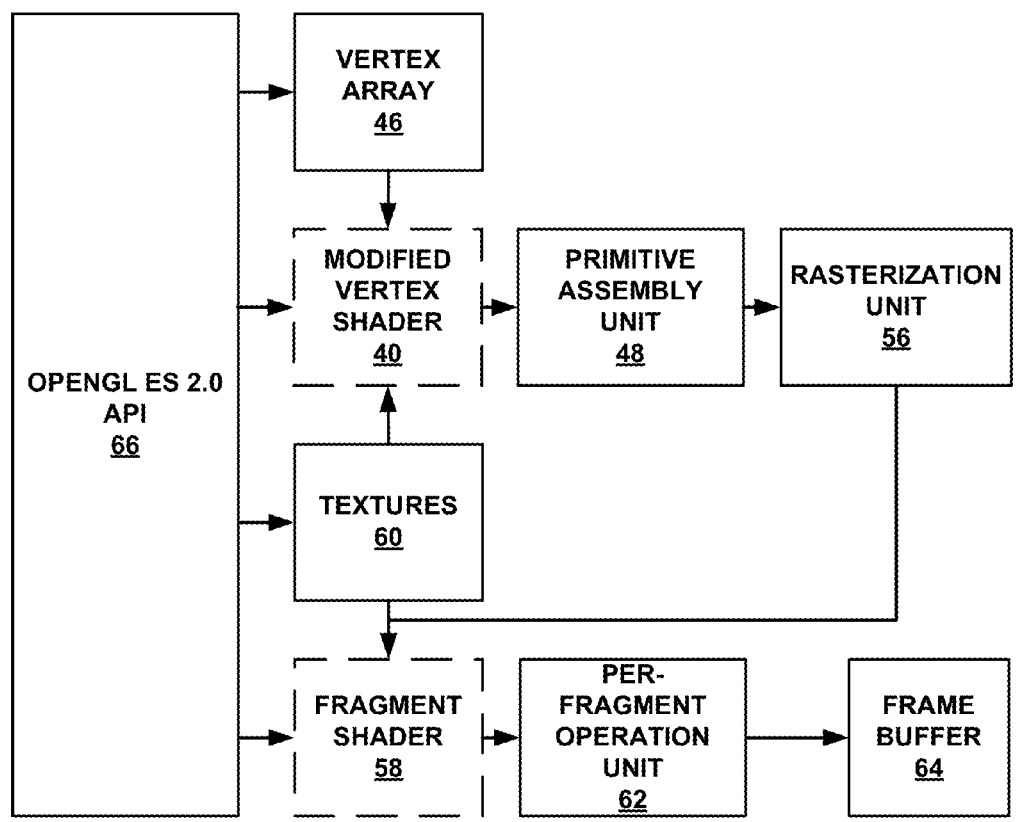
FIG. 9 is a block diagram illustrating another example of a graphics processing unit (GPU) that may implement one or more example techniques described in this disclosure.

FIG. 9 is a block diagram illustrating another example of a graphics processing unit (GPU) that may implement one or more example techniques described in this disclosure. For example, FIG. 9 illustrates the OpenGL ES 2.0 graphics pipeline, and illustrates the manner in which the techniques described in this disclosure may be implemented in the OpenGL ES 2.0 graphics pipeline. Units in FIG. 9 that are similar to FIG. 8 are given the same reference numeral, and are not described further with respect to FIG. 9.

FIG. 9 illustrates OpenGL ES 2.0 API 66, which may be the API that graphic driver 24 implements. In other words, OpenGL ES 2.0 API 66 may be one example of graphics driver 24. As illustrated, OpenGL ES 2.0 outputs vertex array 46, commands to modified vertex shader 40, textures 60, and commands to fragment shader 58. Modified vertex shader 40 receives world coordinate vertices from vertex array 46 and textures from textures 60 and creates the clipping coordinates based on the viewing angle. Primitive assembly unit 48, rasterization unit 56, fragment shader 58, per-fragment operation unit 62, and frame buffer 64 may perform similar functions as those described with respect to FIG. 7.

Figure 10A:
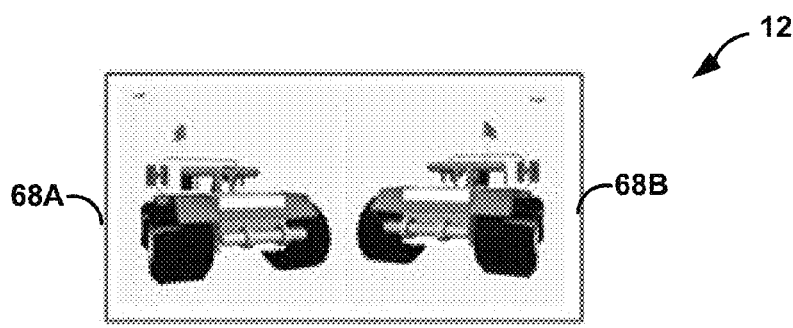
FIGS. 10A-10C are conceptual diagrams illustrating example results in accordance with one or more techniques described in this disclosure.
Figure 10B:
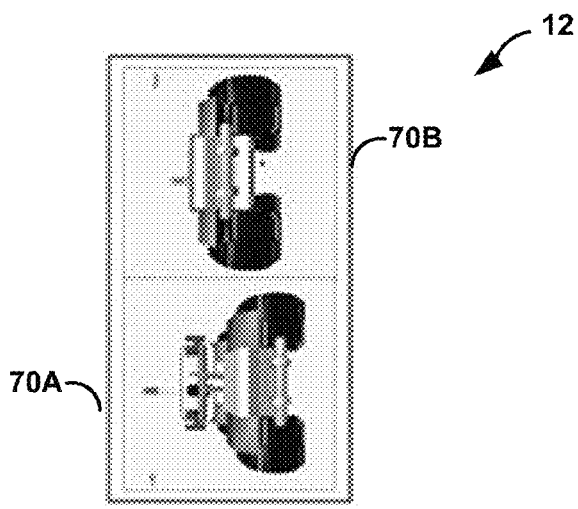
Figure 10C:
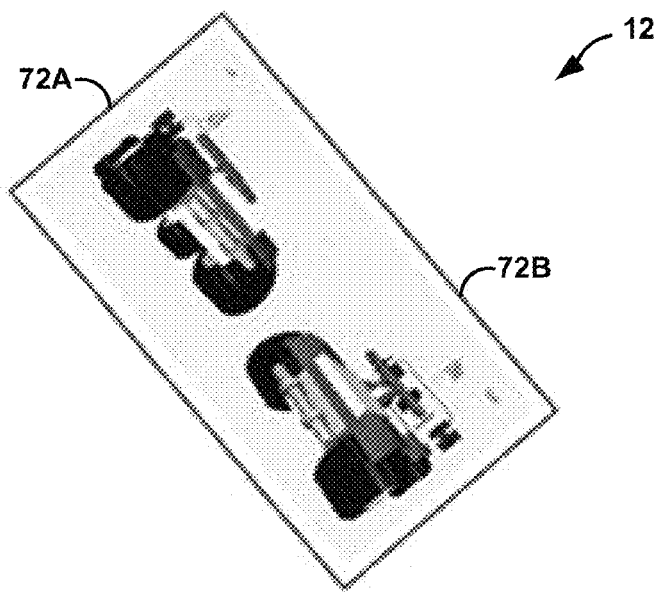

FIGS. 10A-10C are conceptual diagrams illustrating example results in accordance with one or more techniques described in this disclosure. In the example of FIGS. 10A-10C, the resolution of the single image generated by application 42 may be half the resolution of display 12. Accordingly, in FIGS. 10A-10C, the left-eye image appears on half of display 12, and the right-eye image appears on the other half of display 12. For example, FIG. 10A illustrates left-eye image 68A and right-eye image 68B, FIG. 10B illustrates left-eye image 70A and right-eye image 70B, and FIG. 10C illustrates left-eye image 72A and right-eye image 72B. In FIGS. 10A-10C, the left eye of the viewer may only see the left-eye image, and may not see the right-eye image, and the right eye of the viewer may only see the right-eye image, and may not see the left-eye image.

FIG. 10A illustrates the example results when the viewing angle is zero (i.e., in landscape mode). FIG. 10B illustrates the example where the viewer turned device 10 vertically with the viewing angle being may 90° relative to the example of FIG. 10A. In the example of FIG. 10B, although the viewer the orientation of device 10 by 90°, and the rendered image content changed by 90°, the disparity between left-eye image 70A and right-eye image 70B is still in the horizontal direction. Accordingly, for any given viewing angle such as that illustrated in FIG. 9C, the disparity between left-eye image 72A and right-eye image 72B is still in the horizontal direction.

Figure 11:
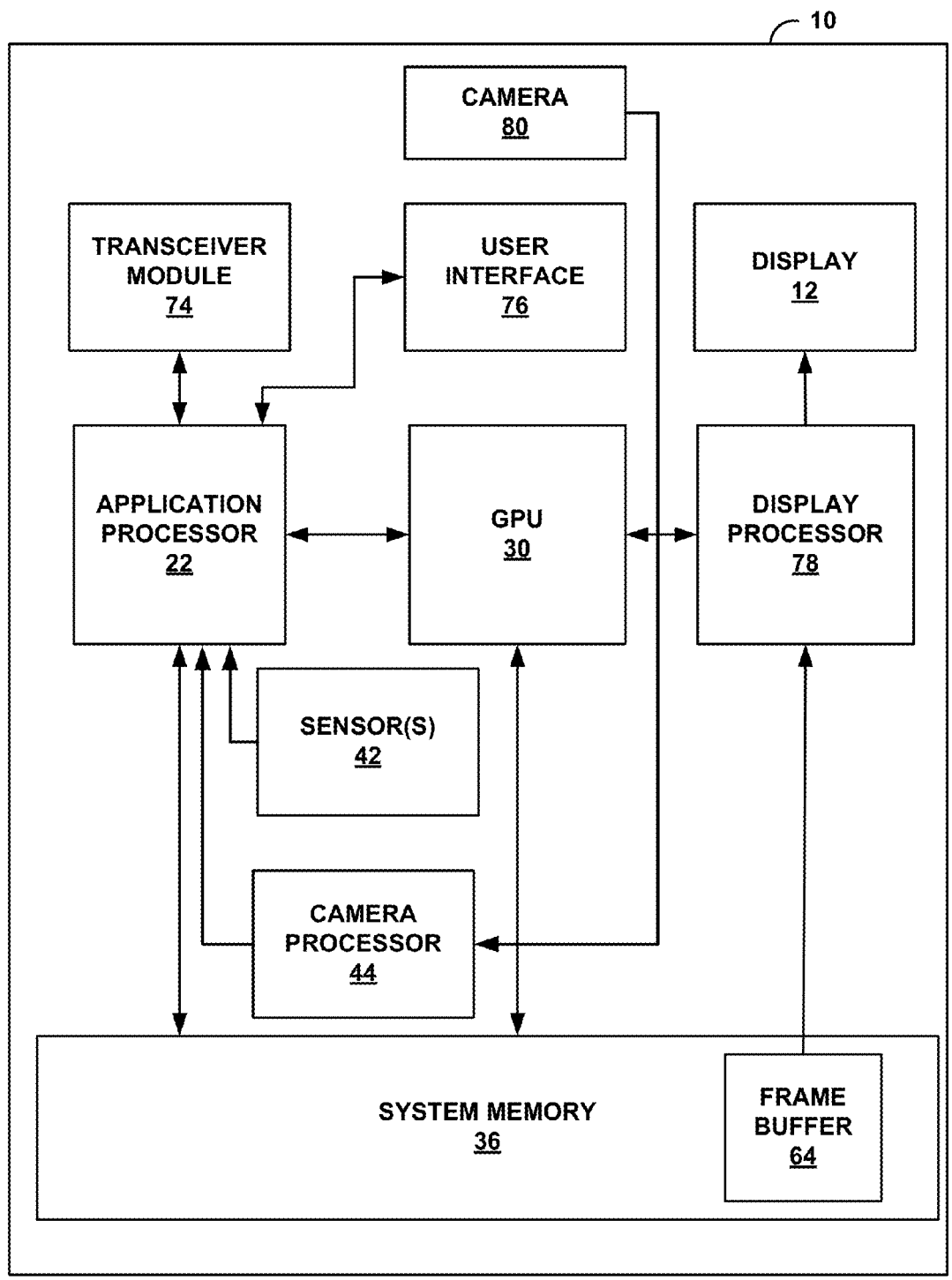
FIG. 11 is a block diagram illustrating the example device of FIG. 5 in further detail.

FIG. 11 is a block diagram illustrating the example device of FIG. 5 in further detail. For instance, FIG. 11 illustrates device 10 of FIG. 5 in further detail. For example, as indicated above, examples of device 10 include, but are not limited to, mobile wireless telephones, PDAs, video gaming consoles that include video displays, mobile video conferencing units, laptop computers, desktop computers, television set-top boxes, and the like.

As illustrated in FIG. 11, device 10 may include display 12, application processor 22, GPU 30, system memory 36, which includes frame buffer 64, camera processor 44, transceiver module 74, user interface 76, display processor 78, and camera 80. Display 12, application processor 22, GPU 30, system memory 36, one or more sensors 42, and camera processor 44 may be substantially similar or identical to those illustrated in FIGS. 1 and 5. For purposes of brevity, only the components that are shown in FIG. 11, but not shown in FIGS. 1 and 5 are described in detail.

Device 10, as illustrated in FIG. 11, may include additional modules or units not shown in FIG. 11 for purposes of clarity. For example, device 10 may include a speaker and a microphone, neither of which are shown in FIG. 11, to effectuate telephonic communications in examples where device 10 is a mobile wireless telephone or a speaker where device 10 is a media player. Furthermore, the various modules and units shown in device 10 may not be necessary in every example of device 10. For example, user interface 76 and display 12 may be external to device 10 in examples where device 10 is a desktop computer or other device that is equipped to interface with an external user interface or display.

Camera 80 may be a front-facing optical camera configured to capture video or images. Camera 80 may output its captured video or images to camera processor 44. Camera processor 44 may determine viewer orientation based on the captured video or images as described above.

Examples of user interface 76 include, but are not limited to, a trackball, a mouse, a keyboard, and other types of input devices. User interface 76 may also be a touch screen and may be incorporated as a part of display 12. Transceiver module 74 may include circuitry to allow wireless or wired communication between device 10 and another device or a network. Transceiver module 74 may include one or more modulators, demodulators, amplifiers, antennas and other such circuitry for wired or wireless communication.

Display processor 78 may be configured to cause display 12 to display stereoscopic view. There may be various techniques that display processor 78 may utilize to cause display 12 to display stereoscopic view, and aspects of this disclosure may utilize any of these techniques. For example, display processor 78 may retrieve the left-eye image from one half of frame buffer 64, retrieve the right-eye image from the other half of frame buffer 64, and interleave the two images together to provide the stereoscopic view.

As another example, display processor 78 may control the refresh rate of display 12. In this example, during each refresh cycle, display processor 78 may cycle between the left-eye image and the right-eye image. For instance, display processor 78 may retrieve the left-eye image from one half of frame buffer 64, expand the left-eye image to the entirety of display 12, and display left-eye image on display 12 for one refresh cycle. Then, for the next refresh cycle, display processor 78 may perform substantially similar functions, but for the right-eye image stored in the other half of frame buffer 64. In other words, display 12 may display the left-eye image, then the right-eye image, then the left-eye image, and so forth.

The viewer may be wearing specialized glasses that are synchronized with the refresh rate of display processor 78. For example, while display 12 is displaying the left-eye image, the specialized glasses may shutter close the right lens so that only the left eye of the viewer captures the left-eye image. Then, while display 12 is displaying the right-eye image, the specialized glasses may shutter close the left lens so that only the right eye of the viewer captures the right-eye image, and so forth. If the refresh rate is fast enough, the viewer perceives stereoscopic view where the image pops out of or pushes into display 12 and encompasses a 3D volume.

In some examples, some conventional display processors may not configured to cause display 12 to display stereoscopic view. In these examples, the viewer may couple device 10 to a display that includes a display processor, such as display processor 78, which is configured to cause display 12 to present the stereoscopic view. For example, the viewer may couple device 10 to a stereoscopic view enabled television via transceiver module 74. For instance, the viewer may couple transceiver module 74 to the television via a high-definition multimedia interface (HDMI) wire. In this example, application processor 22 or GPU 30 may instruct transceiver module 74 to transmit the pixel values stored in frame buffer 64 to the display processor of the television. The display processor of this television may then cause the television to display the left-eye and right-eye images to form the stereoscopic view.

Figure 12:
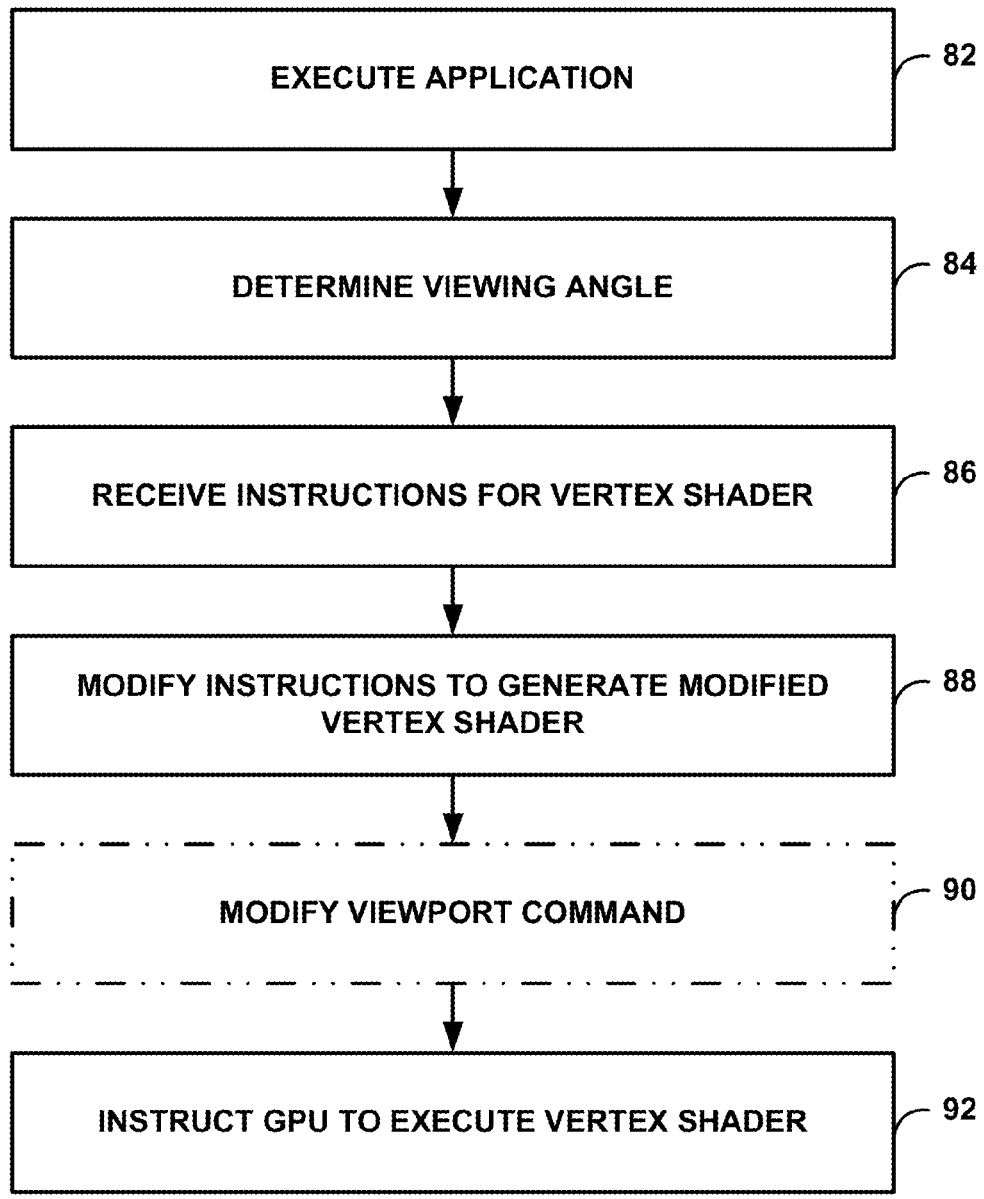
FIG. 12 is a flowchart illustrating an example operation in accordance with one or more example techniques described in this disclosure.

FIG. 12 is a flowchart illustrating an example operation in accordance with one or more example techniques described in this disclosure. For purposes of illustration, reference is made to FIG. 3.

Processor 22 may execute application 42 to generate an image for mono view (82). Processor 22 may implement the other blocks of FIG. 12 during the run-time of application 42. For example, processor 22 may determine a viewing angle relative to display 12. In some examples, processor 22 may determine the viewing angle relative to the display 12 once per generation of the stereoscopic view. To determine the viewing angle, processor 22 may determine at least one the viewer orientation such as by camera processor 44 and display orientation such as by one or more sensors 42.

Processor 22, via graphics driver wrapper 26, may receive instructions for vertex shader 38 (84). Vertex shader 38 may be configured to operate on the image of the mono view generated by the execution of application 42.

Processor 22, via graphics driver wrapper 26, may modify the instructions of vertex shader to include one or more instructions based on the viewing angle to generate a modified vertex shader (e.g., modified vertex shader 40 after compiler 28 compiles vertex shader 38 after the inclusion of the instructions) (86). In this example, modified vertex shader 40, when executed on shader processor 32 of GPU 30, may generate vertex coordinates for vertices of a stereoscopic view.

For example, processor 22, via graphics driver wrapper 26, may add a first instruction in vertex shader 38 that modifies a first clipping coordinate (e.g., the $x_{clip}$) of a vertex of the image of the mono view generated by application 42 based on the viewing angle. For instance, graphics driver wrapper 26 may add the gl_Position.x+=X command, where X equals $D*\cos(\alpha)$ in a first execution of modified vertex shader 40 and equals $-D*\cos(\alpha)$ in a second execution of modified vertex shader 40. Processor 22, via graphics driver wrapper 26, may add a second instruction in vertex shader 38 that modifies a second clipping coordinate (e.g., the $y_{clip}$) of the vertex of the image of the mono view generated by application 42 based on the viewing angle. For instance, graphics driver wrapper 26 may add the gl_Position.y+=Y*width/height, where width and height are the width and height of display 12, and Y equals $D*\sin(\alpha)$ in the first execution of modified vertex shader 40 and equals $-D*\sin(\alpha)$ in the second execution of modified vertex shader 40.

In some examples, as an option, the first and second instructions that graphics driver wrapper 26 adds may also be based on the location of the zero disparity plane. For example, graphics driver wrapper 26 may add the gl_Position.x+=X*(1-gl_Position.w/$ZDP_{loc}$), and may add the gl_Position.y+=Y*width/height*(1-gl_Position.w/$ZDP_{loc}$). The gl_Position.w variable stores the $w_{clip}$ coordinate, which is equal to $-z_{world}$, where $z_{world}$ is the z-coordinate of the vertex as defined by application 42. The $ZDP_{loc}$ indicates the location of the zero disparity plane relative to display 12.

As an option, processor 22, via graphics driver wrapper 26, may modify the viewport command (e.g., glViewport) issued by application 42 (90). This modification of the viewport command may be optional and is therefore illustrated in dashes. Processor 22, via graphics driver wrapper 26, may modify the glViewport command to adjust the horizontal disparity between the first and second images of the stereoscopic view (e.g., the horizontal disparity between the left-eye image and the right-eye image). By adjusting the horizontal disparity, graphics driver wrapper 26 may utilize the modified glViewport command to adjust the location of the zero disparity plane.

Processor 22, via graphics driver wrapper 26, may instruct GPU 30 to execute modified vertex shader 40 (92). For example, processor 22, via graphics driver wrapper 26, may instruct GPU 30 to execute a first instance of the object code of modified vertex shader 40 on shader processor 32 to generate a first image (e.g., left-eye image) of the stereoscopic view based on the viewing angle. Processor 22, via graphics driver wrapper 26, may instruct GPU 30 to execute a second instance of the object code of modified vertex shader 40 on shader processor 32 to generate a second image (e.g., the right-eye image) of the stereoscopic view based on the viewing angle.

The following pseudo-code provides an example of the functionality of graphics driver wrapper 26 and application 42. This pseudo-code is meant to assist with understanding and should not be considered limiting.

1. Graphic driver wrapper 26 intercepts glShaderSource command issued by application 42 to intercept the source code of vertex shader 28.
2. Graphics driver wrapper 26 inserts "uniform float X" and "uniform float Y" into the instructions of vertex shader 38, where "uniform" is a user defined standard attribute variable in OpenGL and OpenGL ES, with programmable shaders.
3. Graphics driver wrapper 26 inserts "gl_Position.x+=X" and "gl_Position.y+=Y*width/height" command in the source code of vertex shader 38.
   3a. Graphics driver wrapper 26 inserts "gl_Position.x+=X*(1-gl_Position.w/$ZDP_{loc}$" and "gl_Position.y+=Y*width/height*(1-gl_Position.w/$ZDP_{loc}$"
4. Application 42 executes glCompileShader command that causes compiler 28 to compile the modified source code instructions of vertex shader 38 to generate the object code of modified vertex shader 40.
5. Application 42 executes the following commands to link to the object code of modified vertex shader 40:
   programObject=glCreateProgram( );
   glAttachShader(programObject, vertexShader);
   glAttachShader(programObject, fragmentShader);
   glLinkProgram(programObject)
6. Graphics driver wrapper 26 intercepts glDraw commands (e.g., glDrawArrays and glDrawElements) when called by application 42, and blocks the commands from being transmitted to GPU 30.
7. Graphics driver wrapper 26 issues the following commands:
   glGetInteger(GL_CURRENT_PROGRAM, &program); //to get pointer to the current vertex shader
   Modify the glViewport command to generate viewport for left-eye image as described above, in some examples.
   p1=glGetUniformLocation(program, X); to get the pointer to uniform X
   p2=glGetUniformLocation(program, Y); to get the pointer to uniform Y
   glUniform1f(p1,D*cos($\alpha$)); //to set the value of X equal to D*cos($\alpha$).
   glUniform1f(p2,D*sin($\alpha$)); //to set the value of Y equal to D*sin($\alpha$)
   glDraw command //to cause GPU 30 to generate the graphics content for the left-eye image
8. Repeat the steps following from 7, with the following modifications to generate the graphics content for the right-eye image:

Modify the glViewport command to generate the viewport for the right-eye image as described above.

glUniform1f(p1, −D*cos(α))//to set the value of X equal to −D*cos(α).

glUniform1f(p2,−D*sin(α))//to set the value of Y equal to −D*sin(α).

glDraw command //to cause GPU 30 to generate the graphics content for the right-eye image.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for graphics processing, the method comprising:
   determining at least one of a viewer orientation or a display orientation;
   determining, with a processor, a viewing angle relative to a display based on at least one of the determined viewer orientation or the determined display orientation;
   receiving, with the processor, instructions for a vertex shader that is configured to operate on an image of a mono view;
   modifying, with the processor, the instructions for the vertex shader to include one or more instructions based on the viewing angle to generate a modified vertex shader, wherein execution of a first instance of the modified vertex shader displaces vertices of primitives in the image of the mono view in one direction based on the viewing angle and execution of a second instance of the modified vertex shader displaces the vertices of the primitives in the image of the mono view in another direction based on the viewing angle to generate vertex coordinates for vertices of a stereoscopic view;
   instructing, with the processor, a graphics processing unit (GPU) to execute the first instance of the modified vertex shader to generate a first image of the stereoscopic view; and
   instructing, with the processor, the GPU to execute the second instance of the modified vertex shader to generate a second image of the stereoscopic view.

2. The method of claim 1, wherein modifying the instructions comprises:
   adding a first instruction into the vertex shader that modifies a first clipping coordinate of a vertex of the image of the mono view based on the viewing angle; and
   adding a second instruction into the vertex shader that modifies a second clipping coordinate of the vertex of the image of the mono view based on the viewing angle.

3. The method of claim 1, wherein modifying the instructions comprises:
   adding a first instruction in the vertex shader that modifies a first clipping coordinate of a vertex of the image of the mono view based on the viewing angle and a location of a zero disparity plane; and
   adding a second instruction into the vertex shader that modifies a second clipping coordinate of the vertex of the image of the mono view based on the viewing angle and the location of the zero disparity plane.

4. The method of claim 1, further comprising:
   modifying an instruction that defines a viewport of the image of the mono view to an instruction that defines a viewport for a first image of the stereoscopic view and to an instruction that defines a viewport for a second image of the stereoscopic view.

5. The method of claim 4, wherein modifying the instruction that defines the viewport of the image of the mono view comprises adjusting a horizontal disparity between the first image of the stereoscopic view and the second image of the stereoscopic view.

6. The method of claim 5, wherein adjusting the horizontal disparity comprises adjusting the horizontal disparity between the first image of the stereoscopic view and the second image of the stereoscopic view to adjust a location of a zero disparity plane.

7. The method of claim 1, further comprising:
   executing an application, with the processor, to generate the image of the mono view,
   wherein modifying the instructions for the vertex shader comprises modifying the instructions for the vertex shader during the execution of the application.

8. The method of claim 1, wherein determining the viewing angle comprises determining the viewing angle once per generation of the stereoscopic view.

9. The method of claim 1,
wherein receiving instructions comprises receiving, with a graphics driver wrapper executing on the processor, the instructions for the vertex shader, and
wherein modifying the instructions comprises modifying, with the graphics driver wrapper execution on the processor, the instructions of the vertex shader.

10. An apparatus comprising:
a graphics processing unit (GPU); and
a processor configured to:
  determine at least one of a viewer orientation or a display orientation;
  determine a viewing angle relative to a display based on at least one of the determined viewer orientation or the determined display orientation;
  modify instructions of a vertex shader that is configured to operate on an image of a mono view to include one or more instructions based on the viewing angle to generate a modified vertex shader, wherein execution of a first instance of the modified vertex shader displaces vertices of primitives in the image of the mono view in one direction based on the viewing angle and execution of a second instance of the modified vertex shader displaces the vertices of the primitives in the image of the mono view in another direction based on the viewing angle to generate vertex coordinates for vertices of a stereoscopic view;
  instruct the GPU to execute the first instance of the modified vertex shader to generate a first image of the stereoscopic view; and
  instruct the GPU to execute the second instance of the modified vertex shader to generate a second image of the stereoscopic view.

11. The apparatus of claim 10, wherein, to modify the instructions, the processor is configured to:
  add a first instruction into the vertex shader that modifies a first clipping coordinate of a vertex of an image of a mono view based on the viewing angle; and
  add a second instruction into the vertex shader that modifies a second clipping coordinate of the vertex of the image of the mono view based on the viewing angle.

12. The apparatus of claim 10, wherein, to modify the instructions, the processor is configured to:
  add a first instruction in the vertex shader that modifies a first clipping coordinate of a vertex of an image of a mono view based on the viewing angle and a location of a zero disparity plane; and
  add a second instruction into the vertex shader that modifies a second clipping coordinate of the vertex of the image of the mono view based on the viewing angle and the location of the zero disparity plane.

13. The apparatus of claim 10, wherein the processor is configured to:
  modify an instruction that defines a viewport of an image of a mono view to an instruction that defines a viewport for a first image of the stereoscopic view and to an instruction that defines a viewport for a second image of the stereoscopic view.

14. The apparatus of claim 13, wherein, to modify the instruction that defines the viewport of the image of the mono view, the processor is configured to adjust a horizontal disparity between the first image of the stereoscopic view and the second image of the stereoscopic view.

15. The apparatus of claim 14, wherein, to adjust the horizontal disparity, the processor is configured to: adjust the horizontal disparity between the first image of the stereoscopic view and the second image of the stereoscopic view to adjust a location of a zero disparity plane.

16. The apparatus of claim 10, wherein the processor is configured to execute an application to generate an image of a mono view, and modify the instruction of the vertex shader during the execution of the application.

17. The apparatus of claim 10, wherein, to determine the viewing angle, the processor is configured to determine the viewing angle once per generation of the stereoscopic view.

18. The apparatus of claim 10, wherein the processor is configured to execute a graphics driver wrapper, and wherein the processor is configured to modify the instructions of the vertex shader via the graphics driver wrapper.

19. The apparatus of claim 10, wherein the apparatus comprises one of a mobile wireless telephone, a personal digital assistant, a video gaming console, a mobile video conferencing unit, a laptop computer, a desktop computer, a digital media player, and a tablet computing device.

20. The apparatus of claim 10, further comprising:
  at least one of an accelerometer, a gyroscope, and a camera,
  wherein the processor is configured to determine the viewing angle relative to the display based on outputs from one or more of the accelerometer, the gyroscope, and the camera.

21. A processor configured to determine at least one of a viewer orientation or a display orientation, determine a viewing angle relative to a display based on at least one of the determined viewer orientation or the determined display orientation, receive instructions for a vertex shader that is configured to operate on an image of a mono view, modify the instructions for the vertex shader to include one or more instructions based on the viewing angle to generate a modified vertex shader, wherein execution of a first instance of the modified vertex shader displaces vertices of primitives in the image of the mono view in one direction based on the viewing angle and execution of a second instance of the modified vertex shader displaces the vertices of the primitives in the image of the mono view in another direction based on the viewing angle to generate vertex coordinates for vertices of a stereoscopic view, instructs a graphics processing unit (GPU) to execute a first instance of the modified vertex shader to generate a first image of the stereoscopic view, and instruct the GPU to execute the second instance of the modified vertex shader to generate a second image of the stereoscopic view.

22. An apparatus comprising:
  a graphics processing unit (GPU);
  means for determining at least one of a viewer orientation or a display orientation;
  means for determining a viewing angle relative to a display based on at least one of the determined viewer orientation or the determined display orientation;
  means for receiving instructions for a vertex shader that is configured to operate on an image of a mono view;
  means for modifying the instructions for the vertex shader to include one or more instructions based on the viewing angle to generate a modified vertex shader, wherein execution of a first instance of the modified vertex shader displaces vertices of primitives in the image of the mono view in one direction based on the viewing angle and execution of a second instance of the modified vertex shader displaces the vertices of the primitives in the image of the mono view in another direction based on the viewing angle to generate vertex coordinates for vertices of a stereoscopic view;

means for instructing the GPU to execute the first instance of the modified vertex shader to generate a first image of the stereoscopic view; and means for instructing the GPU to execute the second instances of the modified vertex shader to generate a second image of the stereoscopic view.

23. The apparatus of claim 22, further comprising a processor, wherein the processor includes the means for determining, the means for receiving, the means for modifying, and the means for instructing.

24. The apparatus of claim 22, wherein the means for modifying comprises:

first means for adding a first instruction into the vertex shader that modifies a first clipping coordinate of a vertex of the image of the mono view based on the viewing angle; and second means for adding a second instruction into the vertex shader that modifies a second clipping coordinate of the vertex of the image of the mono view based on the viewing angle.

25. The apparatus of claim 22, wherein the means for modifying comprises:

first means for adding a first instruction in the vertex shader that modifies a first clipping coordinate of a vertex of the image of the mono view based on the viewing angle and a location of a zero disparity plane; and second means for adding a second instruction into the vertex shader that modifies a second clipping coordinate of the vertex of the image of the mono view based on the viewing angle and the location of the zero disparity plane.

26. The apparatus of claim 22, further comprising:

means for modifying an instruction that defines a viewport of the image of the mono view to an instruction that defines a viewport for a first image of the stereoscopic view and to an instruction that defines a viewport for a second image of the stereoscopic view.

27. The apparatus of claim 26, wherein the means for modifying the instruction that defines the viewport of the image of the mono view comprises means for adjusting a horizontal disparity between the first image of the stereoscopic view and the second image of the stereoscopic view.

28. The apparatus of claim 27, wherein the means for adjusting the horizontal disparity comprises means for adjusting the horizontal disparity between the first image of the stereoscopic view and the second image of the stereoscopic view to adjust a location of a zero disparity plane.

29. The apparatus of claim 22, further comprising:

means for executing an application to generate the image of the mono view, wherein the means for modifying the instructions for the vertex shader comprises means for modifying the instructions for the vertex shader during the execution of the application.

30. The apparatus of claim 22, wherein the means for determining the viewing angle comprises means for determining the viewing angle once per generation of the stereoscopic view.

31. A non-transitory computer-readable storage medium having instructions stored thereon that, when executed, cause one or more processors to:

determine at least one of a viewer orientation or a display orientation;

determine a viewing angle relative to a display based on at least one of the determined viewer orientation or the determined display orientation;

receive instructions for a vertex shader that is configured to operate on an image of a mono view;

modify the instructions for the vertex shader to include one or more instructions based on the viewing angle to generate a modified vertex shader, wherein execution of a first instance of the modified vertex shader displaces vertices of primitives in the image of the mono view in one direction based on the viewing angle and execution of a second instance of the modified vertex shader displaces the vertices of the primitives in the image of the mono view in another direction based on the viewing angle to generate vertex coordinates for vertices of a stereoscopic view;

instruct a graphics processing unit (GPU) to execute the first instance of the modified vertex shader to generate a first image of the stereoscopic view; and instruct the GPU to execute the second instance of the modified vertex shader to generate a second image of the stereoscopic view.

* * * * *